United States Patent [19]
Pechanek et al.

[11] Patent Number: 5,325,464
[45] Date of Patent: Jun. 28, 1994

[54] PYRAMID LEARNING ARCHITECTURE NEUROCOMPUTER

[75] Inventors: Gerald G. Pechanek, Cary, N.C.; Stamatis Vassiliadis, Vestal; Jose G. Delgado-Frias, Endwell, both of N.Y.

[73] Assignee: International Business Machines Corporation, Armonk, N.Y.

[21] Appl. No.: 79,695

[22] Filed: Jun. 18, 1993

Related U.S. Application Data

[63] Continuation of Ser. No. 702,263, May 17, 1991, abandoned, and a continuation-in-part of Ser. No. 526,866, May 22, 1990, Pat. No. 5,065,339, Ser. No. 682,786, Apr. 9, 1991, Ser. No. 681,842, Apr. 8, 1991.

[51] Int. Cl.$^5$ .............................................. G06F 15/00
[52] U.S. Cl. ...................................... 395/27; 395/11; 395/800
[58] Field of Search ........................... 395/27, 11, 800

[56] References Cited

PUBLICATIONS

"Parallel Distributed Processing vol. 1: Foundation" Rumelhart et al, Cambridge, Mass: MIT Press 1986.
"Neurons with Graded Response Have Collective . . . " Hopfield Proceedings of Nat'l Acad. of Sci. 81, pp. 3088-3092, May 1984.
"Neural Networks and Physical Systems with . . . " Hopfield Proceedings of Nat'l Acad. of Sci. 79, pp. 2554-2558, 1982.
"NETtalk: A Parallel Network that Learns to Read Aloud" T. J. Seijnowski et al, JHU/EECS-8601, 1986.
"Scaling the Neural TSP Algorithm" R. Cuykendall et al Biological Cybernetics 60, pp. 365, 371, 1989.
"Explorations in Parallel Distributed Processing . . . " McClelland et al, Cambridge, Mass: MIT Press, 1988.
"Neural Computation of Decisions in Optimization Problems" Hopfield et al, Biological Cybernetics 52, pp. 141, 152, 1985.
"Optimization by Neural Networks" Ramanujam et al, IEEE Int'l Conf. on Neural Network vol. II, pp. 325-332, Jul. 1988.
DAIR Computer Systems, Connections: The Traveling Salesman User Manual Release 1.0 Palo Alto, CA, DAIR Computer 1988.
"Alternative Networks for Solving tge Traveling . . . " IEEE Int'l Conf. on Neural Network, vol. II, pp. 333-340, Jul. 1988.
Implementing Neural Nets with Programmable Logic; Vidal IEEE Trans. on Acoustics, . . . vol. 36 No. 7 pp. 1180-1190 Jul. 1988.
Design of Parallel Hardware Neural Network from Custom . . . Eberhardt et al: IJCNN; vol. 2 Jun. 18-22, 1989; pp. II-190.

Primary Examiner—Allen R. MacDonald
Attorney, Agent, or Firm—Eugene I. Shkurko

[57] ABSTRACT

The Pyramid Learning Architecture Neurocomputer (PLAN) is a scalable stacked pyramid arrangement of processor arrays. There are six processing levels in PLAN consisting of the pyramid base, Level 6, containing $N^2$ SYnapse Processors (SYPs), Level 5 containing multiple folded Communicating Adder Tree structures (SCATs), Level 4 made up of N completely connected Neuron Execution Processors (NEPs), Level 3 made up of multiple Programmable Communicating Alu Tree (PCATs) structures, similar to Level 5 SCATs but with programmable function capabilities in each tree node, Level 2 containing the Neuron Instruction Processor (NIP), and Level 1 comprising the Host and user interface. The simplest processors are in the base level with each layer of processors increasing in computational power up to a general purpose host computer acting as the user interface. PLAN is scalable in direct neural network emulation and in virtual processing capability. Consequently, depending upon performance and cost trade-offs, the number of physical neurons N to be implemented is chosen. A neural network model is mapped onto Level 3 PCATs, Level 4 NEPs, Level 5 SCATs, and Level 6 SYPs. The Neuron Instruction Processor, Level 2, controls the neural network model through the Level 3 programmable interconnection interface. In addition, the NIP level controls the high speed and high capacity PLAN I/O interface necessary for large N massively parallel systems. This discussion describes the PLAN processors attached to a Host computer and the overall control of the pyramid which constitutes the neurocomputer system.

32 Claims, 19 Drawing Sheets

INSTRUCTION FORWARDING

LEVEL 3, AND 4 GENERAL FORMAT

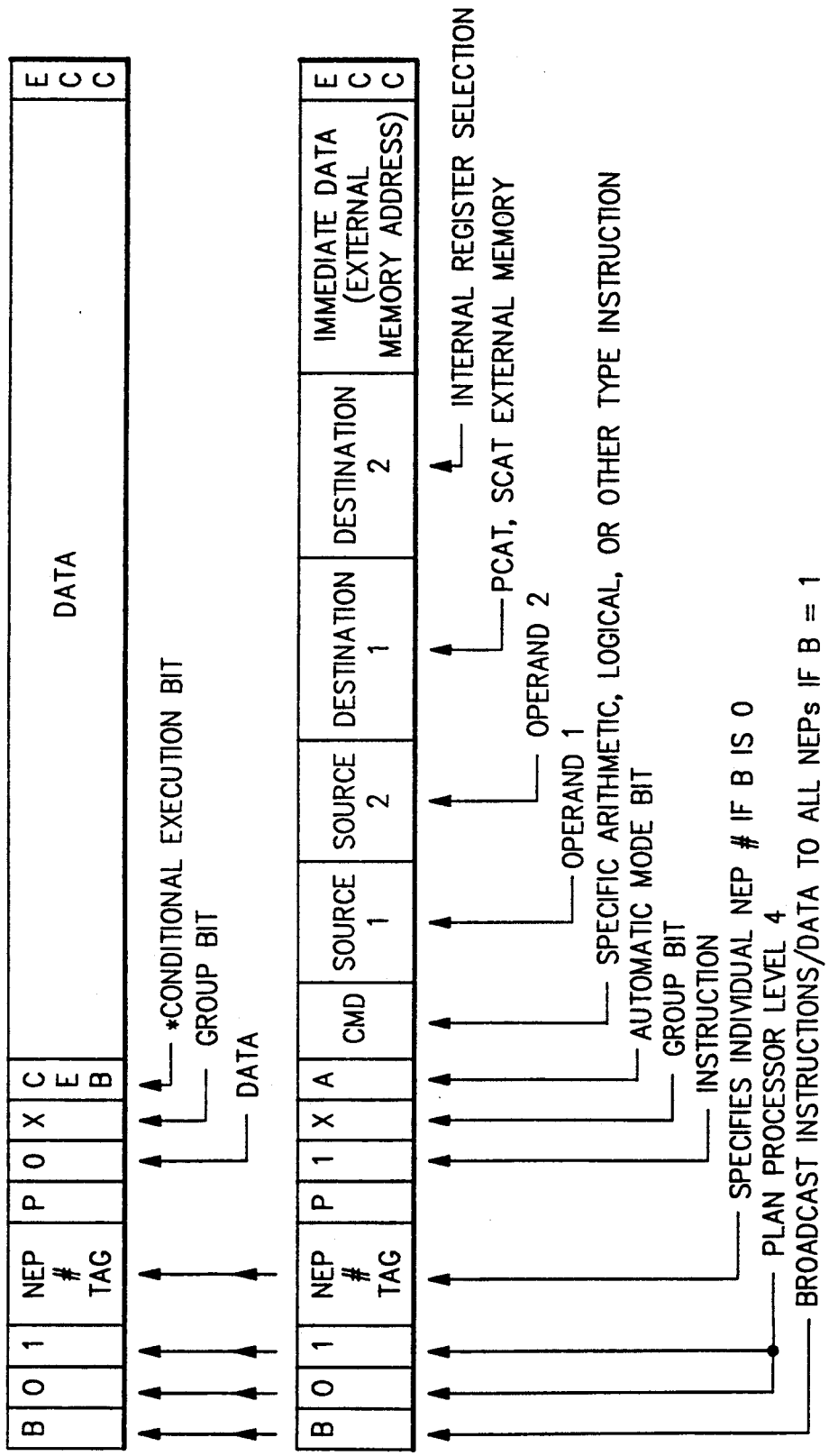

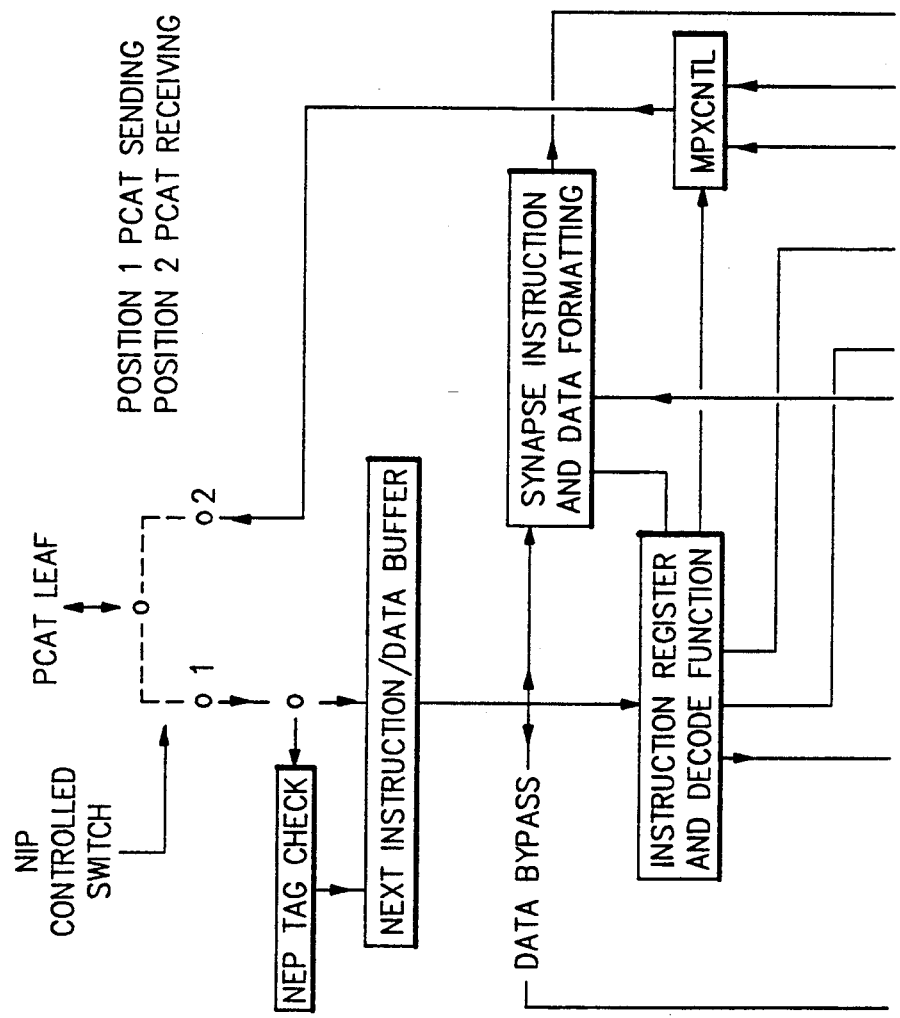

POSITION OF CITY ON PATH

```
           1  2  3  4  5
CITY 1     0  0  1  0  0      PATH INDICATED IS
CITY 2     0  1  0  0  0    CITY 4 ⟶ CITY 2 ⟶ CITY 1
CITY 3     0  0  0  0  1    ⟶ CITY 5 ⟶ CITY 3 ⟶ CITY 4
CITY 4     1  0  0  0  0
CITY 5     0  0  0  1  0
```

NEP LIFE SCOREBOARD SERIAL INTERFACE

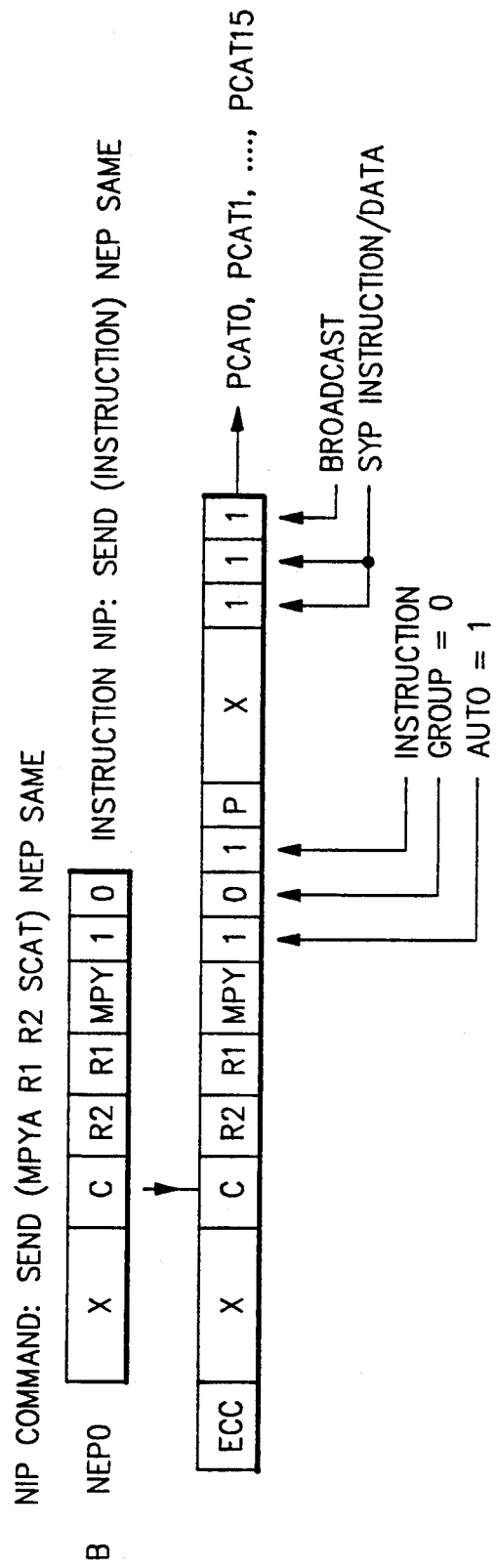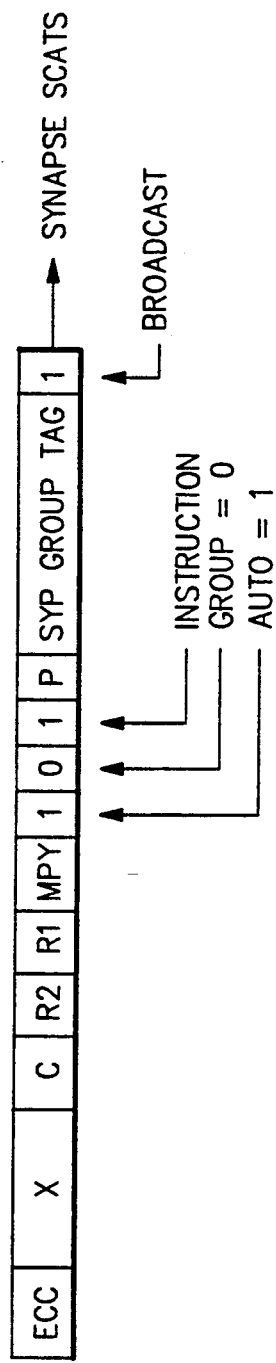
FIG.21

PYRAMID LEARNING ARCHITECTURE NEUROCOMPUTER

CROSS REFERENCE TO RELATED APPLICATIONS

This application is a continuation of U.S. application Ser. No. 07/702,263, filed May 17, 1991, now abandoned and is a continuation-in-part of the following related co-pending Patent Applications: APPARATUS AND METHOD FOR NEURAL PROCESSOR, S. Vassiliadis, and G. G. Pechanek, U.S. Ser. No. 07/526,866, filed May 22, 1990; issued as U.S. Pat. No. 5,065,339; sometimes referred to as "SNAP"; A TRIANGULAR SCALABLE NEURAL ARRAY PROCESSOR, G. G. Pechanek, and S. Vassiliadis, U.S. Ser. No. 07/682,786, filed Apr. 9, 1991 sometimes referred to as "T-SNAP"; SPIN: A SEQUENTIAL PIPELINED NEURO COMPUTER, S. Vassiliadis, G. G. Pechanek, and J. G. Delgado-Frias, U.S. Ser. No. 07/681,842, filed Apr. 8, 1991 sometimes referred to as "SPIN".

In addition, filed concurrently are related applications: A LEARNING MACHINE SYNAPSE PROCESSOR SYSTEM APPARATUS G. G. Pechanek, S. Vassiliadis, and J. G. Delgado-Frias, U.S. Ser. No. 07/702,261, filed May 17, 1991, now abandoned, sometimes referred to as "LEARNING MACHINE"; VIRTUAL NERUOCOMPUTER ARCHITECTURES FOR NEURAL NETWORKS, G. G. Pechanek, J. G. Delgado-Frias, and S. Vassiliadis, U.S. Ser. No. 07/702,260, filed May 17, 1991, issued as U.S. Pat. No. 5,243,688, sometimes-referred to as "VIRTUAL"; SCALABLE FLOW VIRTUAL LEARNING NEUROCOMPUTER G. G. Pechanek, S. Vassiliadis, and J. G. Delgado-Frias, U.S. Ser. No. 07/702,262, filed May 17, 1991, sometimes referred to as "SVLM".

These co-pending applications and the present application are owned by one and the same assignee, namely, International Business Machines Corporation of Armonk, N.Y.

The descriptions set forth in these co-pending applications are hereby incorporated into the present application by this reference.

FIELD OF THE INVENTION

The inventions relate to Neurocomputers and their architectures and particularly to an architecture having a stacked pyramid arrangement of processors.

REFERENCES USED IN THE DISCUSSION OF THE INVENTIONS

During the detailed discussion of our inventions, we will reference other work including our own unpublished works which are not Prior Art but which will aid the reader in following our discussion. These additional references are:

D. E. Rumelhart, J. L. McClelland, and the PDP Research Group, *Parallel Distributed Processing Vol. 1: Foundations* Cambridge, Mass.: MIT Press 1986. (Herein referred to as "Rumelhart 86".)

J. J. Hopfield, "Neurons With Graded Response Have Collective Computational Properties Like Those of Two-State Neurons," *Proceedings of the National Academy of Sciences* 81, pp. 3088-3092, May, 1984. (Herein referred to as "Hopfield 84".)

J. J. Hopfield, "Neural Networks and Physical Systems with Emergent Collective Computational Abilities," *Proceedings of the National Academy of Sciences* 79, pp. 2554-2558, 1982. (Herein referred to as "Hopfield 82".)

T. J. Seijnowski and C. R. Rosenberg, "NETtalk: A Parallel Network that learns to Read Aloud." *The Jons Hopkins University Electrical Engineering and Computer Science Technical Report*, JHU/EECS-8601, 1986. (Herein referred to as "Seijnowski 86".)

R. Cuykendall and R. Reese, "Scaling the Neural TSP Algorithm," *Biological Cybernetics* 60, pp. 365,371, 1989. (Herein referred to as "Cuykendall 89".)

A TRIANGULAR SCALABLE NEURAL ARRAY PROCESSOR, G. G. Pechanek, and S. Vassiliadis, U.S. Ser. No. 07/682,786, filed Apr. 8, 1991 herein sometimes referred to as "T-SNAP" or "Pechanek T-SNAP 91".)

A LEARNING MACHINE SYNAPSE PROCESSOR SYSTEM APPARATUS G. G. Pechanek, S. Vassiliadis, and J. G. Delgado-Frias, U.S. Ser. No. 07/702,261, filed May 17, 1991 now abandoned, sometimes referred to as "LEARNING MACHINE" or Pechanek LEARNING 91.)

SCALABLE FLOW VIRTUAL LEARNING NEUROCOMPUTER G. G. Pechanek, S. Vassiliadis, and J. G. Delgado-Frias, U.S. Ser. No. 07/702,262, filed May 17, 1991 sometimes referred to as "FLOW" or Pechanek SVLM 91.

J. L. McClelland and D. E. Rumelhart, *Explorations in Parallel Distributed Processing: A Handbook of Models, Programs and Exercises* Cambridge, Mass.: MIT Press, 1988. (Herein referred to as "McClelland 88".)

APPARATUS AND METHOD FOR NEURAL PROCESSOR, S. Vassiliadis, and G. G. Pechanek, U.S. Ser. No. 07/526,866, filed May 18, 1990, herein sometimes referred to as "SNAP" or "Vassiliadis SNAP 90".

J. J. Hopfield and D. W. Tank, "Neural Computation of Decisions in Optimization Problems," *Biological Cybernetics* 52, pp. 141,152, 1985. (Herein referred to as "Hopfield 85".)

J. Ramanujam and P. Sadayappan, "Optimization by Neural Networks", *IEEE International Conference on Neural Networks*, Vol. II, pp. 325-332, July 1988. (Herein referred to as "Ramanujam 1988".)

DAIR Computer Systems, Connections: The Traveling Salesman User Manual Release 1.0 Palo Alto, Calif.: DAIR Computer Systems, 1988. (Herein referred to as "DAIR 1988".)

R. D. Brandt, Y. Wang, A. J. Lamb, and S. K. Mitra, "Alternative Networks for Solving tge Traveling Salesman Probelm and the List-Matching Problem," *IEEE International Conference on Neural Networks*, Vol. II, pp. 333-340, July 1988. (Herein referred to as "Brandt 88".)

BACKGROUND OF THE INVENTION

A number of mathematical frameworks for neural networks, such as the Parallel Distributed Processing model of Rumelhart 86 and the Hopfield network of Hopfield 82 and Hopfield 84, require a network of fully connected neural processing elements. Multiple, if not all, neurons have the same operational specifications. In the Hopfield model all neurons are specified with the same operation, while in multilayer networks the specifications may vary by layer. The computational tasks for neural networks have been developed by the cited earlier references. However, we have now come to appreciate that the four basic neural emulation operations, learning, and neurocomputer system level requirements imply a set of requirements that can be the basis for a new architecture not found in the art.

SUMMARY OF OUR INVENTIONS

The Pyramid Learning Architecture Neurocomputer (PLAN) is a scalable stacked pyramid arrangement of processor arrays. In accordance with our inventions, the architecture which we have developed will provide a computer system apparatus having a scalable hierarchical processing architecture for the emulation of neural networks providing multiple levels of processing, consisting of the communications of instructions and data between each processing level and the execution, in either a programmable or fixed fashion, of the instructions at each level. In our apparatus the neurocomputer will have a N neuron structure of multi-levels of processors. We provide a Level 1 processor, termed the host processor; a Level 2 processor, termed the Neuron Instruction Processor (NIP); N Level 4 processors, termed the Neuron Execution Processors (NEPs); a Level 3 programmable function and connection processor interface between the NIP and the N NEPs; and $N^2$ Level 6 processors, termed the SYnapse Processors (SYPs); as well as N Level 5 processors, termed the Synapse Communicating Adder Trees (SCATs) providing the interface between the N NEPs and the $N^2$ SYPs with Level 5 and 6 constituting a scalable group partitioned virtual neural synapse processor architecture.

Thus generally it may be understood that the best way to implement our preferred embodiments is with the six processing levels in PLAN consisting of the pyramid base, Level 6, containing $N^2$ SYnapse Processors (SYPs), Level 5 containing multiple folded Communicating Adder Tree structures (SCATs), Level 4 made up of N completely connected Neuron Execution Processors (NEPs), Level 3 made up of multiple Programmable Communicating Alu Tree (PCATs) structures, similar to Level 5 SCATs but with programmable function capabilities in each tree node, Level 2 containing the Neuron Instruction Processor (NIP), and Level 1 comprising the Host and user interface. The simplest processors are in the base level with each layer of processors increasing in computational power up to a general purpose host computer acting as the user interface. PLAN is scalable in direct neural network emulation and in virtual processing capability. Consequently, depending upon performance and cost trade-offs, the number of physical neurons N to be implemented is chosen. A neural network model is mapped onto Level 3 PCATs, Level 4 NEPs, Level 5 SCATs, and Level 6 SYPs. The Neuron Instruction Processor, Level 2, controls the neural network model through the Level 3 programmable interconnection interface. In addition, the NIP level controls the high speed and high capacity PLAN I/O interface necessary for large N massively parallel systems. In our preferred embodiment illustrated herein the PLAN processors are attached to a Host computer which provides for transfers which provide the overall control of the pyramid which constitutes the neurocomputer system.

These and other improvements are set forth in the following detailed description. For a better understanding of the inventions, together with advantages and features, reference may be had to the co-pending applications for other developments we have made in the field. However, specifically as to the improvements, advantages and features described herein, reference will be made in the description which follows to the below-described drawings.

BRIEF DESCRIPTION OF THE DRAWINGS

FIG. 7 illustrates the neuron execution processor instruction/data format.

FIG. 17 and FIGS. 17A and 17B shows a neuron execution processor with external memory.

FIG. 21 shows the NIP command to NEPs and NEP commands to SYPs.

Figure 1:
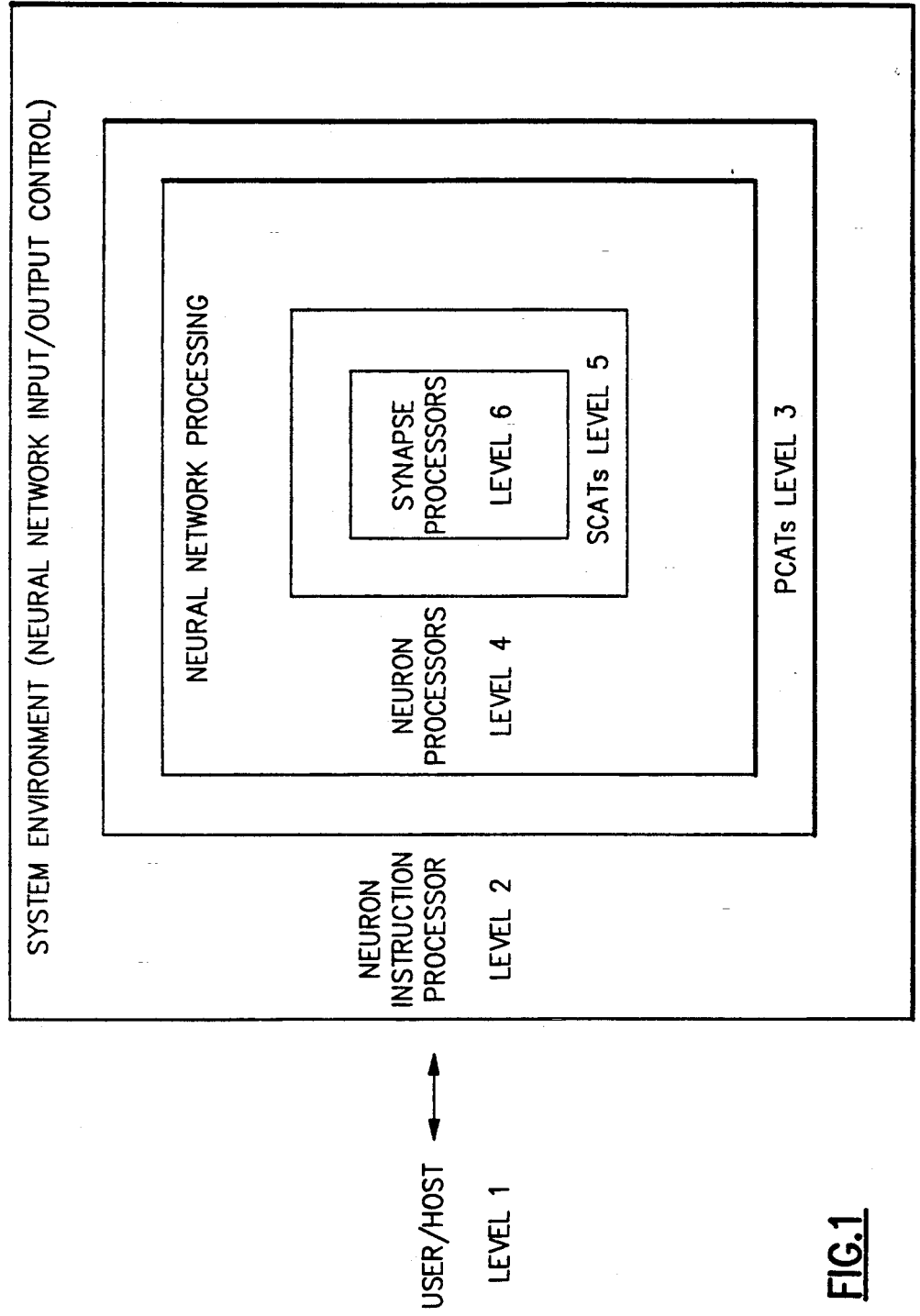
FIG. 1 illustrates our PLAN learning machine hierarchy of control and architecture.

(Note: For convenience of illustration, FIGURES may be separated in parts and as a convention we place the top of the FIGURE as the first sheet, with subsequent sheets proceeding down when viewing the FIGURE, in the event that multiple sheets are used.)

Our detailed description follows as parts explaining our preferred embodiments of our inventions provided by way of example.

DETAILED DESCRIPTION OF THE INVENTIONS

Before considering our preferred embodiments, it may be worthwhile to set forth some generally understood premises which have been addressed by the inventions and improvements which we detail.

INTRODUCTION

A number of mathematical frameworks for neural networks, such as the Parallel Distributed Processing model discussed in the background of the inventions section, require a network of fully connected neural processing elements in which multiple, if not all, neurons have the same operational specifications. In the Hopfield model all neurons are specified with the same operation, while in multilayer networks the specifications may vary by layer. The computational tasks for neural network emulation, to be implemented by the neurocomputer architecture discussed in this discussion, are given by equation 1 and 2 which are based on a subset of the full Parallel Distributed Processing model of Rumelhart 86 and the Hopfield network of Hopfield 84. Learning requirements will be addressed later.

$$Y_i = F\left(\sum_{j=1}^{N} Y_j W_{ij} + Ex_i\right) \quad (1)$$

Where:
N is the number of neurons in the neural network.
The subscripts on the weights W (such as $W_{13}$) are to be interpreted as meaning the weight of the connection from Neuron 3 to Neuron 1.
$Y_j$ is the $j^{th}$ neuron output value connected to the $i^{th}$ neuron input through a connection weight of $W_{ij}$.
$Ex_i$ is an external input to the $i^{th}$ neuron.
$-A \leq Ex_i \leq +A$ where $-A$ equates to $Y_i=0$ and $+A$ equates to $Y_i=1$ ($\pm$ an acceptable range of error) for the case where $Ex_i$ is the only input to the neuron.
$F(z_i)$ is the neuron activation function which many times is set equal to a
sigmoid activation function whose form, for example, is:

$$F(z_i) = \frac{1}{1 + e^{-\frac{2z}{T}}} \quad (2)$$

Where:
For the function $$F(z_i)z_i = \sum_{j=1}^{N} Y_j W_{ij} + Ex_i$$

$0 \leq F(Z_i) \leq 1$
T is a global control parameter used to modify the slope of the sigmoid function for a given set of $z_i$ values.
e=Natural log (2.71828 ...)

Equations 1 and 2, for a completely connected N neuron network, contain four basic neural emulation operations:
1. $N^2$ Multiplications (synapse function)
2. N Product Summations (synapse accumulation function)
3. N Activation Functions (neuron function)
4. $N \times N$ Communications (connectivity function)

Learning places additional requirements onto the neurocomputing structure, for example, Back-Propagation learning (see Rumelhart 86) introduces requirements for comparison of neural outputs with expected outputs, mechanisms that back-propagate signals, and various operations on weight values, such as the calculation of a Δ weight followed by an addition of the old weight value with the Δ weight. The numerous learning algorithms indicate that a programmable processing mechanism should be used in the synapse function for weight modification.

Many requirements of a neurocomputer system are at the system level, for example:
1. User interface
2. Initialization
   Connection weights
   Neuron specification (input, activation, and output functions)
   Neural network organization (number of neurons, type of network, etc.)
   Initial Y values (if required)
   Teacher values (if required)
   Network parameters (number of update cycles, learning rates, etc.)
3. Starting the neural network
4. Providing inputs to the neural network model
5. Stopping the neural network
   Convergence checking—programmable function
   Host specified R update cycles have been completed
6. Program control of the neural network model with synchronization among all processors.
   Sequence control for multi-layer networks
   Data storage and accessibility
   Support of multiple network models including learning algorithms The four basic neural emulation operations, learning, and neurocomputer system level requirements imply a set of requirements that are the basis for PLAN. For simplicity of discussion, all Ns are assumed to be even powers of 2, unless otherwise stated. Briefly, since each neuron input function requires up to N multiplications, it would be desirable for good performance to have $N^2$ multipliers which could operate in parallel. The summation of up to N product terms for each neuron implies that N summation mechanisms be provided that operate in parallel. The numerous types of activation functions indicate that, at the neuron level, there is a need for programmability. The $N \times N$ communications dictates a completely connected interconnection means for the N neurons. Learning requires that the $N^2$ connection weights be modifiable and, in a fully connected model, if good performance is to be attained, independent and parallel processing functions should be used for each connection weight. These requirements lead to a Host attached multilevel hierarchical processing structure which is termed the Pyramid Learning Architecture Neurocomputer or PLAN. The detailed requirements for PLAN, as well as example choices for implementations, will be discussed in this discussion which will view PLAN from the perspective of neural networks. Hosts with imbedded subsystems which interact with the HOST are known. Consequently, HOST interfacing and Host compiler requirements will not be specifically addressed as they are not nessary to understand the implementation of our inventions and not pertinent to the structure or definition of the behavior of PLAN as used for neural network emulation. For further understanding of the PLAN structure, the "classic" Hopfield Traveling Salesman Problem neural network model will be presented.

PLAN: PYRAMID LEARNING ARCHITECTURE FOR NEUROCOMPUTING

The dynamic execution mode of neural network operation, the learning mode, and system requirements dictate the structure of the Pyramid Learning Architecture Neurocomputer. The requirements are made up of two distinct groups, those associated with neural network emulation and those associated with interfacing to the neural network model. There are five basic requirements to be met by PLAN to emulate a neural network:
1. The synapse or connection function is obtained through programmable processors each with access to external data memory. No independent instruction fetching facility is provided. Rather, the SYnapse Processors (SYPs) act as programmable execution units. Sufficient synapse processors, $N^2$ of them, and sufficient external data memory are provided to meet intended applications, including virtual processing.

2. Results from the synapse processor computations are to be accumulated in a constant amount of time and in synchronism (synapse accumulation function).

3. The neuron function is obtained through programmable processors, each with access to external data memory. In a similar manner to the SYPs, the Neuron Execution Processors (NEPs) only execute received instructions. Sufficient neuron processors, N of them, and sufficient external data memory are provided to meet intended applications, including virtual processing.

4. The N neuron processors are completely connected through the neuron input connection weights, i.e. the synapse processors. A range of connectivity is provided through control of the connection weight values.

5. Results from the neural computations are to be operated upon in a convergent fashion either through arithmetic or logical functions (neural convergence function). For example:

Network convergence testing where all neurons are at a "0" or a "1" level, as in the Hopfield model.

Network convergence testing where all the specified neurons match some "teacher" pattern, as in back-propagation learning.

Provision for the summation of N neuron outputs.

The relative size of the neuron and synapse processors can be assessed since most neural applications require a large number of neurons. For example, "NETtalk: a parallel network that learns to read aloud" of Sejnowski 86 used 302 neural units, and a Hopfield type neural network used in a shortest path problem of up to 165 nodes required that 27,225 neurons essentially be modeled in Cuykendall 89. Since N is typically large, the synapse processors must be "small" since $N^2$ are needed while still providing the required synapse function. For example:

The functions provided by the synapse processors are dictated by the emulation mode (multiplication), the learning mode (addition, multiplication, etc.), etc.

For synchronism reasons, each of the selected synapse processors, up to $N^2$ of them, execute the same function in parallel in the same constant amount of time.

Since $N<<N^2$, the neuron execution units are provided with greater functional capabilities than that allowed in the synapse processors. For example:

Choice of functions that are equivalent to synapse function set.

Choice of neural output function: for example: binary threshold, linear, and sigmoid Compare operations as required for convergence testing of a neural output.

Provision for neuron bit vector operations.

Sufficient external data memory must be provided to support the virtual processing requirements of the intended applications given that N physical processors exist in a PLAN machine.

There are three basic requirements to be met by the interface to the neurons, i.e. system level requirements:

1. A user interface for neural network specification, control, and analysis is provided.

High Level Language (HLL) capability for application development neurocomputer PLAN compiler 2. High bandwidth I/O interface User keyboard User display Disk I/O, for example storing:
  connection weight storage
  Y value storage
  Input patterns
  Teacher patterns
  Network parameters
  Communications 3. For flexibility and to support the parallel processing capabilities inherent in PLAN, a microcoded controller is provided to issue the instructions to the parallel processors that emulate a neural network.

The requirements to emulate neural networks are discussed first. The first requirement is met by the synapse processors, SYPs, which are programmable and contain an instruction set architecture. Since the SYP instruction set architecture is problem dependent, the SYP architecture can be varied to suit the application thereby optimizing its design. Sufficient external data memory must be provided at the synapse processing level to support virtual neural emulation where each of the $N^2$ SYPs support virtual connection weight processing. Multiple schemes can be suggested to implement the second and fourth requirements such as the use of a cross bar switch to meet the interconnection requirement and the use of a fast tree structure to meet the summation requirement. Another alternative is the use of the communicating adder trees provided in Pechanek TSNAP 91. which meets both requirements with one structure. The third requirement is met by the Neuron Execution Processors, NEPs, which are programmable and contain an instruction set architecture. Since the NEP instruction set architecture is problem dependent, the NEP architecture can be varied to suit the application, thereby optimizing its design. Sufficient external data memory must be provided at the neural execution processing level to support virtual neuron processing. The fifth requirement dictates the need to process data from N neurons in a programmable fashion. Multiple schemes can be suggested for this such as the connection of the neuron elements in a serial ring, connection by nearest neighbor in a square arrangement of neurons, a single communicating tree with the N neurons at the tree leaf nodes, the use of multiple communicating trees, the use of multiple folded communicating trees provided in Pechanek TSNAP 91, etc. Of these, only two will be investigated in this discussion, namely the use of multiple communicating trees and the use of multiple folded communicating trees.

The system level requirements are discussed next. The user interface requirements cause PLAN to be a Host attached neurocomputer. To facilitate the user interface, a High Level Language (HLL) interface to PLAN can be used, operating on a standard commercially available von Neumann type of computer acting as the Host computer, for example a S/370 machine. A compiler generates a Host executed assembly language output which interfaces directly to a microcoded controller. The second system level requirement for I/O and the third system level requirement for a microcoded controller is met by a processor that interfaces to the Host. This processor is termed the Neuron Instruction Processor, NIP, and supports the parallel processing capabilities defined by the neural network emulation requirements. The NIP issues all NEP, SYP, and neural convergence function instructions for the purpose of emulating a neural network. The determination of whether all, a subset of, or none of the NEP, SYP, and neural convergence function instructions are available at the assembly language level is a matter that is beyond the scope of this discussion. The NIP, as the controller of activity on PLAN, is able to coordinate PLAN processing with PLAN I/O operations. The I/O interface is provided to both the neuron and synapse external memories allowing support of initialization, the saving of network models, and other system level requirements.

A PLAN machine will be presented in this discussion which meets the listed requirements based on a choice of the structural elements. For example the N×N interconnection and synapse accumulation function requirements are combined and both met by the communicating adder trees as described in Pechanek TSNAP 91. The I/O requirement is imbedded into the PLAN structure as controlled by the NIP interfacing with the NEP and SYP levels of the structure. Consequently, the requirements map to six that directly relate to a six level hierarchical arrangement of processing elements which constitutes the PLAN machine.

1. Level 1: Host interface
    Providing a user interface to PLAN.
    Providing an application development interface to PLAN.
2. Level 2: Neuron Instruction Processor (NIP)
    Providing programmable control of Levels 3, 4, 5, and 6.
    Providing I/O interface control to Levels 4 and 6 external memories.
    Providing read/write access to PLAN external memories.
3. Level 3: Programmable Communicating Alu Trees (PCATs)
    Providing a Level 2 to 4 interconnection network.
    Providing programmable operations on Level 4 outputs.
4. Level 4: N Neuron Execution Processors (NEPs)
    Providing programmable neuron processors.
    Providing hybrid data dependent execution processing in an automatic mode.
    Providing SYP instruction formatting.
    Providing SCAT control.
5. Level 5: Communicating Adder Trees (SCATs)
    Providing a Level 4 to 6 interconnection network.
    Providing a summation function on Level 6 outputs.
6. Level 6: $N^2$ SYnapse Processors (SYPs)
    Providing programmable connection weight processors.
    Providing hybrid data dependent execution processing in an automatic mode.

PLAN provides a hierarchy of both control and processing capability, symbolically illustrated in FIG. 1. Each level constitutes a higher level of control over the previous level/s with the simplest processors in Level 6. The user and Host are external to the neural processing system and represent the highest level of control. The Neuron Instruction Processor (NIP) controls the total neural network model mapped onto Levels 3, 4, 5, and 6 where Level 4 controls Level 6.

Figure 2:
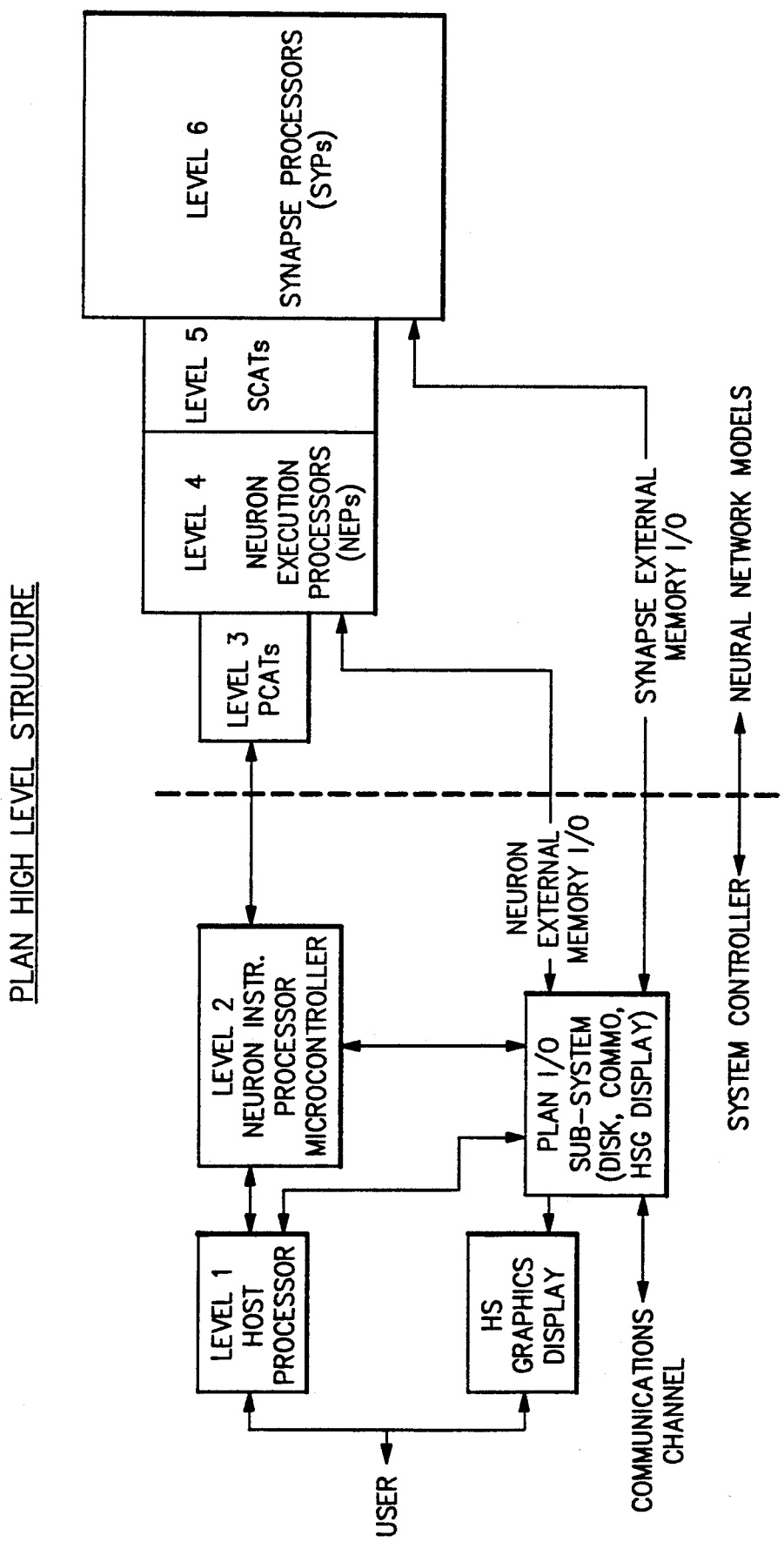
FIG. 2 shows the PLAN high level structure.

FIG. 2 depicts the six level hierarchical structure. In the envisioned system, the users interface with their Host computer, Level 1 of the pyramid structure, and utilize a High Speed/density Graphics Display (HSGD) for monitoring neural network emulation information. Level 2 controls the neurocomputer I/O subsystem interface to Levels 4 and 6. The primary data source for the HSGD is available from Level 4 where neuron output state Y values, teacher data, and selective trace data, such as the derivative of the output state ($Y(1-Y)$) values (as per Pechanek LEARNING 91), are kept stored. Due to the potentially large quantity of connection weights, $N^2$ values for N neurons, a high speed disk interface is provided from the Level 2 controlled I/O subsystem to the Level 6 connection weight storage. In addition, also due to the potentially large amount of information that might be required to be transferred between users' systems, a dedicated communications channel is assumed. The Host has access to the I/O subsystem through an independent port. The Level 2 processor controls the neural network system's operating environment. A multiple tree interconnection structure, made up of programmable processing nodes, (PCATs) connects the N neurons to the "higher" processing level NIP. A neural network model is mapped onto the four processing layers, Level 3 PCATs, Level 4 NEPs, Level 5 SCATs, Level 6 SYPs, and controlled by the Level 2 NIP which provides the initialization data, execution control, control of pattern application, learning algorithm control, and general data interfacing. Level 2 accomplishes this through microcoded routines which interpret the high level Host commands, the sending of instructions to be executed by the NEPs in Level 4, and by providing the necessary data, in the required form, through an I/O subsystem with the necessary performance and storage characteristics. The NIP controls the N NEPs and each NEP controls N SYPs. In a general sense, all six levels of PLAN can be programmable. As will be used for neurocomputing in this discussion though, the processing capabilities in the Level 5 SCAT nodes will be fixed. In addition, PLAN allows scaling in both direct emulation performance and in virtual processing capacity and performance supporting neural execution and learning (as per Pechanek SVLM 91).

For example, with N equal to 256 neurons, Level 6 would contain 65,536 synapse processors (SYPs), Level 5 would contain 256 SCATs, Level 4 has the 256 neuron execution processors (NEPs), Level 3 would be made up of K PCATs, where, for example, $K = \sqrt{N} = 16$, Level 2 would contain the neuron instruction processor (NIP), and Level 1 would contain the Host and its interface.

Figure 3:
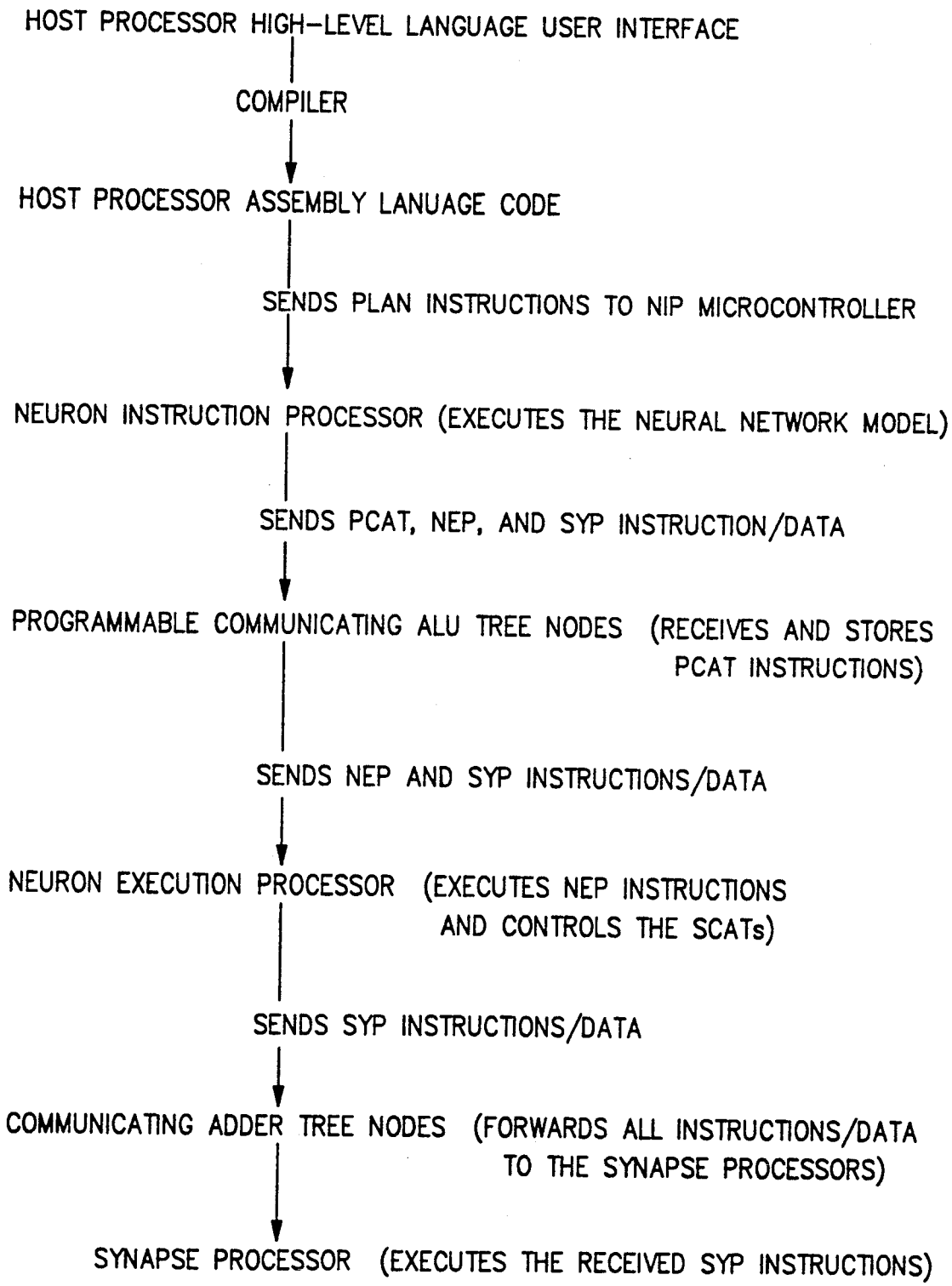
FIG. 3 shows the PLAN hierarchy of control.

The Host to synapse processing hierarchy of control and programmability is illustrated in FIG. 3. A PLAN compiler would take the HLL as source and produce assembly code which interfaces to the NIP. In general, PLAN instructions, initiated from the Host Level 1, control the Neuron Instruction Processor in Level 2. The PLAN instructions are interpreted by the NIP which then forwards instructions to Levels 3, 4, and 6. PLAN functions may require conditional branching mechanisms and data analysis routines be present in the NIP. The PLAN compiler and the NIP microcode ensure no destination conflicts occur and that optimum utilization of the processor levels is obtained. For neurocomputing applications, the Level 5 is assumed to contain fixed processing elements, providing either a forward summation or a reverse communication function. All active neuron processors execute the same NEP instruction though on different neuron data, and all selected synapse processors execute the same SYP instruction though on different synapse data. Levels 3, 4, 5, and 6 must operate in a parallel pipelined fashion with different operations occurring in each level. Further, the operations in each level are dependent upon functions being completed in the separate levels and the summations and communications between levels being completed. A Level 4 processor instruction (common to all selected Level 4 NEPs) is not "fired" until the previous instruction has been completed. The NEP instructions are issued to the NEPs in a standard control flow sequence, though the execution of some of the instructions is done in a data dependent manner.

LEVEL 1 HOST GENERAL DESCRIPTION

The Host Level 1 provides a user interface for the emulation of neural network models on the PLAN system. There may be a library of existing designed neural networks and a mechanism whereby a new neural network can be created. Since there are many types of neural network structures and learning algorithms, an example of the types of user specified information required will be reviewed. Inherent in a neural network model definition are Host functions that, for example:

Initiate all activities on PLAN
Specify the number of neurons that require execution
Specify the neuron input function, e.g.

$$\sum_{j=1}^{N} W_{ij} Y_j$$

Specify the neuron activation function, e.g.
sigmoid
linear threshold
interactive activation and competition
Specify controlling parameters both global and model specific, e.g.
number of cycle to run the model
convergence criteria
temperature
learning rates
input patterns
teacher patterns
etc.

An example of a user interface can be found in McClelland 88. The purpose of this discussion is not to define the system programming model to be used at the Host level but rather to focus on the architecture of and control of Levels 3, 4, 5, and 6 where the neural network model will be mapped. It is important to note that the user has the capability of selecting stored neural network models and of specifying the many parameters associated with the use of those models, those parameters which must be passed to PLAN Level 2.

LEVEL 2 NIP MICROCONTROLLER GENERAL DESCRIPTION

High level Description

The Host Level 1 neural program issues a PLAN instruction and parameters to the Neuron Instruction Processor (NIP). A NIP interpreter decodes the PLAN instruction and causes the proper instruction or sequence of instructions be sent to the PCAT, NEPs, or SYPs. Obviously, only PCAT, NEP, and SYP instructions, as defined by the individual level's instruction set architecture, are issued by the microcoded NIP. In addition, the NIP processes results/status received from the NEPs over the PCATs. The SYPs are viewed as programmable execution units belonging to the NEPs. A SYP instruction, issued by the NIP, is received and decoded in the NEP which initiates the activity of sending the SYP instruction, in the correct format, to the N attached SYPs. It is assumed that mechanisms are maintained in Level 2, either through hardware or microcode or both. This ensures all interface specifications are met, including the locking of functions to prevent any hazards from occurring.

The NIP may send groups of instructions to the NEPs in an interlocked fashion. Multiple instructions can be sent to the NEPs, as each NEP maintains an active instruction register and a buffer of pending instructions. The size of the buffer is dictated by the application and performance requirements. It may be the case that a smaller buffer will require greater service from the NIP to keep full utilization of the NEPs. For NEP only instructions with a NEP instruction buffer of one, the NIP must send the next NEP instruction in less than or equal to time that the NEPs take to complete the active instruction, in order to maintain full NEP utilization. In addition, for many neural applications, the sequence of NEP and SYP instructions is known in advance and is not dependent upon previous calculations being completed. After completion of a group of instructions on the NEPs, notification is provided to the NIP through the PCAT. This is conceptually similar to the way the NEPs operate the synapse processors in that between level 4 and 6 one instruction is sent and completion information is provided back to the NEPs interlocking further execution of the next instruction on the synapse processors. Between Levels 2 and 4, a group of NEP instructions are sent and completion of the group operation is sent back to the NIP, interlocking further execution of the next group of instructions on the NEPs. An instruction group of size 1 provides the same interlocking mechanism between levels 2 and 4 that exists between levels 4 and 6. The NEP response notification mechanism will be discussed more thoroughly in the Level 3 PCAT description.

For good performance in large N systems, the high load functions such as that required by the disk and graphics interface are assumed to be placed in separate specialized interfaces rather than handling the interfaces directly in NIP. For example, a microprocessor controlled disk I/O interface would operate in parallel with NIP. Since all processor operations on Levels 4 and 6 are controlled from the NIP, the data transfers to/from the NEP and SYP external memories are also controlled by the NIP. A memory bus controller provides the primary interface between the PLAN memories and the I/O devices. Depending upon N, technology considerations, and performance requirements, multiple buses could be used in the memory interfaces. The NIP maintains read/write access to Level 4 NEP external memory as the means to obtain results of NEP calculations. In addition, the NIP maintains access to Level 6 SYP external memory as the means to access the connection weight data.

In summary, Levels 3, 4, 5, and 6 are operated in a synchronistic fashion initiated and controlled from Level 2.

LEVEL 2 SPECIFIC REQUIREMENTS

For example, some of the NIP functional characteristics are:
1. Receive and interpret host commands
2. Provide a PLAN I/O interface (Disk, Display, Communications, etc.)
3. Programmable command interface to Level 3 PCATs
4. Programmable command interface to Level 4 NEPs
5. Programmable command interface to Level 6 SYPs through Level 4 decode and control
6. Control the initialization of the External Inputs ($Ex_i$) and Teacher Patterns ($TP_i$) NEP external memory arrays (Level 4).
7. Control the initialization of the W and Y synapse processor external memory (Level 6).
8. Maintain read/write access to Level 4 external memory.

LEVEL 2 NIP TO LEVEL 3 PCAT INTERFACE DESCRIPTION

Level 2 can specify the function of each stage of the PCAT by sending an instruction with a PCAT tag. Instructions or data may also be sent to level 4 NEPs of the PLAN hierarchy from the Level 2 NIP. A lower level of the hierarchy does not send instructions to higher processing levels, where a larger level number indicates a lower level of the hierarchy. PLAN instructions are sent only down the hierarchy. Results and status of computations from a lower level of PLAN are sent upward, and it is assumed that the destination is only the next processing level above the source of the data. A level of the hierarchy, receiving a result or status word from a lower level, will process the received information as specified by the instruction loaded from a higher level than the receiving level. In this fashion, results or status information do not need a header indicating the destination. For the neurocomputer applications, as described in this discussion, only the NIP will generate all instructions to be executed on each of the lower levels of PLAN.

All instructions sent on the pyramid are tagged, indicating their destination processing level. At each PCAT node and each NEP, the tagged bit-serial instruction/data stream is checked to determine if the serial stream is intended for that particular node or level. If the tags do not match at a Level 3 node, the node logic guarantees the movement of the tagged information continues to the next node/level. If, on the other hand, the tag does match at some node or level, then the rest of the bit string, be it data or instruction, is received at that particular node/level. Associated with each instruction/data bit string is a second signal line which provides a synchronization tag indicating that valid information has been placed on the bit-serial bus. This synchronization tag will be assumed to be present in all future discussions. For the present PLAN system being described, the NEPs receive both Level 4 and Level 6 tagged information. The broadcast bit is a level specific bit in that it pertains to all processing nodes within a level. NEPs may buffer multiple synapse instructions but can send only one instruction or data word at a time to the synapse processors over the SCATs. Each instruction or data in auto mode elicits a completion response, either as a summation data result or a status word. This fixed single execution control method allows the synchronistic use of the communicating trees. In the PCATs, as in the SCATs, a forward packet send path can be implemented which is independent of a reverse communication path for results/status. Due to the anticipated large number of synapse processors, each with a local processing capability, a single instruction/response sequence is discussed as the primary architecture. This is assumed in the form of the synapse commands used in the co-pending Pechanek SVLM 91. Since there are considerably less NEPs than SYPs, this single instruction interlocking mechanism can be modified. Instead of having a single instruction response completion sequence as used with the synapse processors, the NEPs may buffer multiple NEP instructions and will generate a response to the NIP upon completion of a group of instructions. No further group of NEP instructions can be sent by the NIP to the NEPs until a response is received from the previous group of instructions. The first NEP instruction received from a group may begin execution while the rest of the group is being received. All instructions are sent in the order that they are desired to be executed at a level and the NEP instruction execution is sequential and in the order received. Synapse commands can be intermixed with NEP only instructions in the NEP instruction buffer. The execution of the next NEP instruction after a synapse instruction or after multiple synapse instructions will not take place until all the synapse processor instructions have completed. For example in back-propagation learning there are multiple commands that the synapse processors must execute on their own connection weights, namely a multiply of an error signal times the stored neural state value and store the result in a local synapse register, followed by a multiply of the previous result by a learning rate creating a $\Delta$ weight, and then an addition of the $\Delta$ weight with the old weight storing the result in a local register or in external Level 4 memory. These instructions to the synapse processors are received in the NEP buffers and executed in the order received. The next NEP instruction after these multiple synapse instructions must wait until all the previous synapse instructions have been completed.

Figure 4:
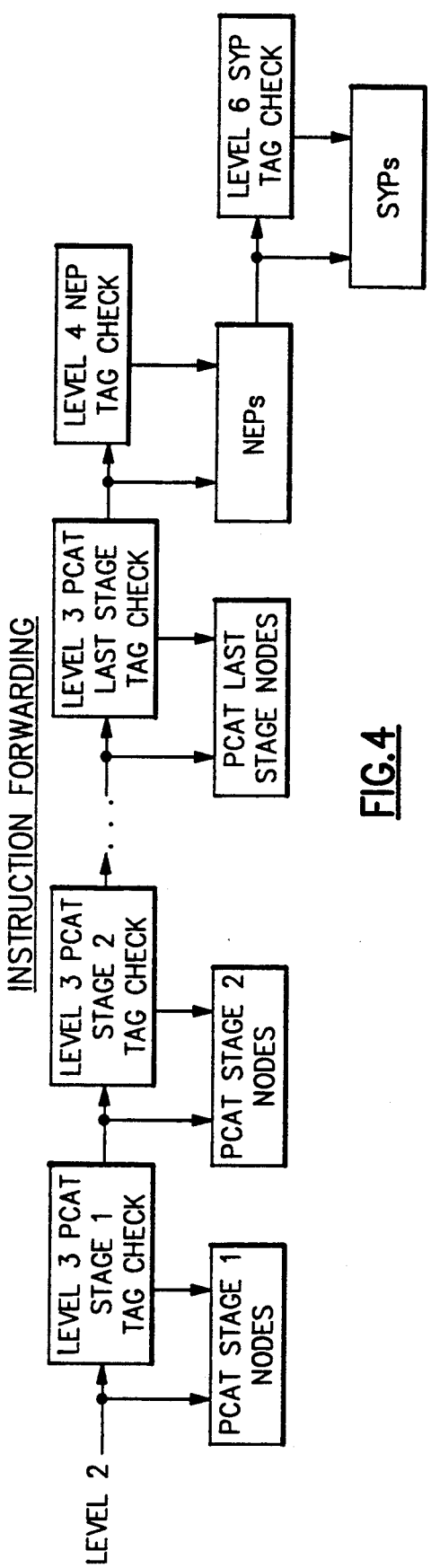
FIG. 4 illustrates instruction forwarding.

The NIP information sending path is symbolically pictured in FIG. 4. Multiple methods can be used to implement the tag checking method of determining the instruction/data destination. For example, each stage of the hierarchy can receive the instruction/data header first and then determine if there is a match in destination and continue to receive or forward the information in a sequential process one stage at a time. An alternative, which might be appropriate for the PCATs, would be to have all PCAT nodes receive the instruction/data in a pipe-lined fashion one bit at a time such that each stage of the PCAT has only a single timing bit difference from the previous stage in receipt of the instruction. Each stage of the PCAT determines whether it is to receive the instruction or not, and only the matching destination nodes will receive it. The rest of the nodes will reject it. This mechanism works fine for situations where the all nodes of the PCAT are to provide the same function, i.e. a broadcast packet to all PCAT nodes. Only the instruction header needs to be received at each node to determine the path for the rest of the instruction.

Figure 5:
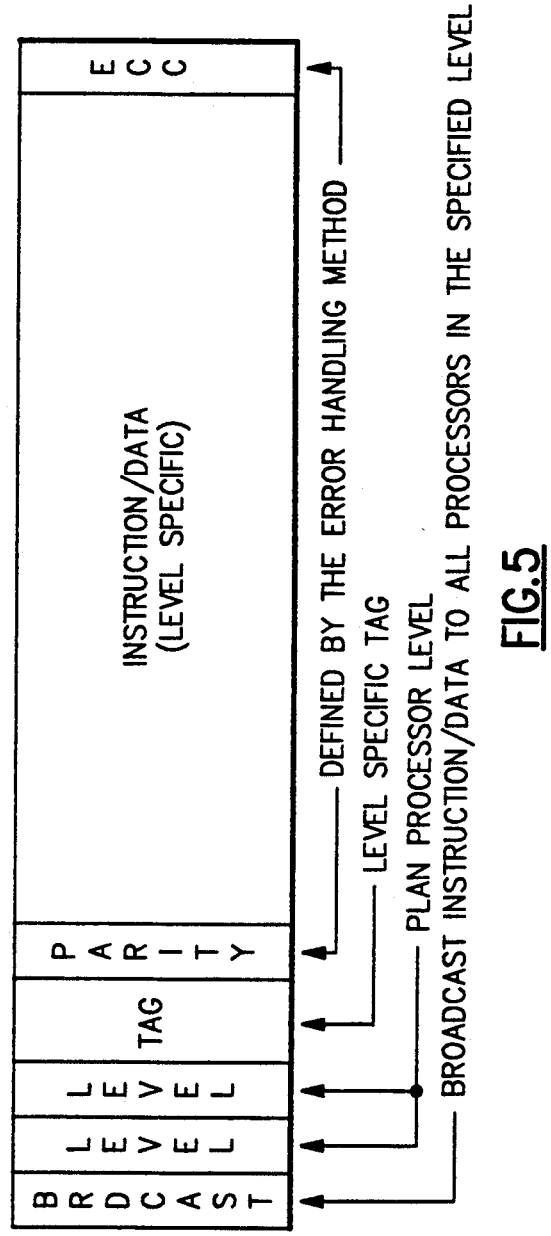
FIG. 5 illustrates the level 3 and 4 general format.

An instruction/data word is started with a header which is made up of multiple fields, including a broadcast bit, a PLAN level field, a level specific tag field, and an optional parity bit (or ECC bits as determined by an error handling method). FIG. 5 depicts the general form of instructions/data that are sent on the PLAN structure. A broadcast bit, if a "1", indicates that at the specified PLAN level defined by the next two bits, all processors are to receive the information. If the B bit is a "0", then the receiving processor checks the level bits, which if there is a match, must then check the level specific tag field to determine if the information is to be received at that particular processor. For the PLAN system being described, which contains fixed processing functions in Level 5 and the NEPs receiving and decoding SYP instructions, the two level bits are defined as follows:

00 = Level 3 PCATs
01 = Level 4 NEPs
10 = Level 5 SCATs (Not used)
11 = Level 6 SYPs (Received by NEPs)

Because of the synchronization tag, the instructions and data may be of varying lengths and formats depending upon the Level specified. See specific processor level instruction/data formats. Within a level all instructions and data are of the same length. Unused sections of an instruction will be labeled with an "x" indicating a don't care specification.

Figure 6:
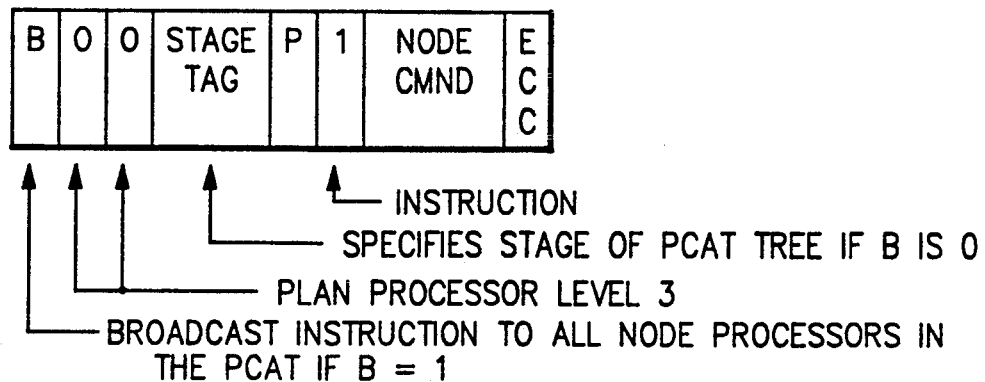
FIG. 6 illustrates the PCAT instruction format.
Figure 8:
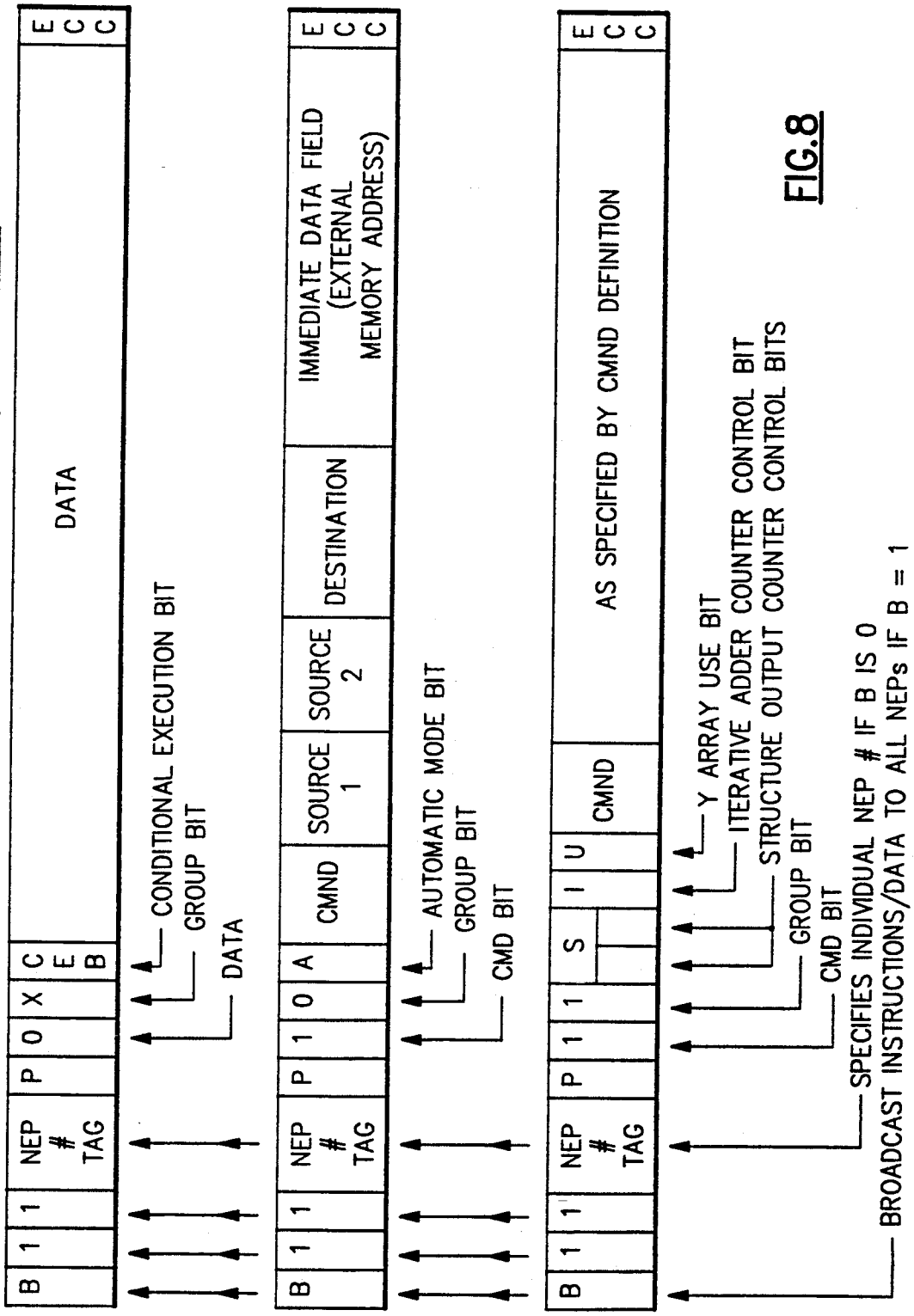
FIG. 8 shows the NEP received synapse processor group instruction/data format.
Figure 9:
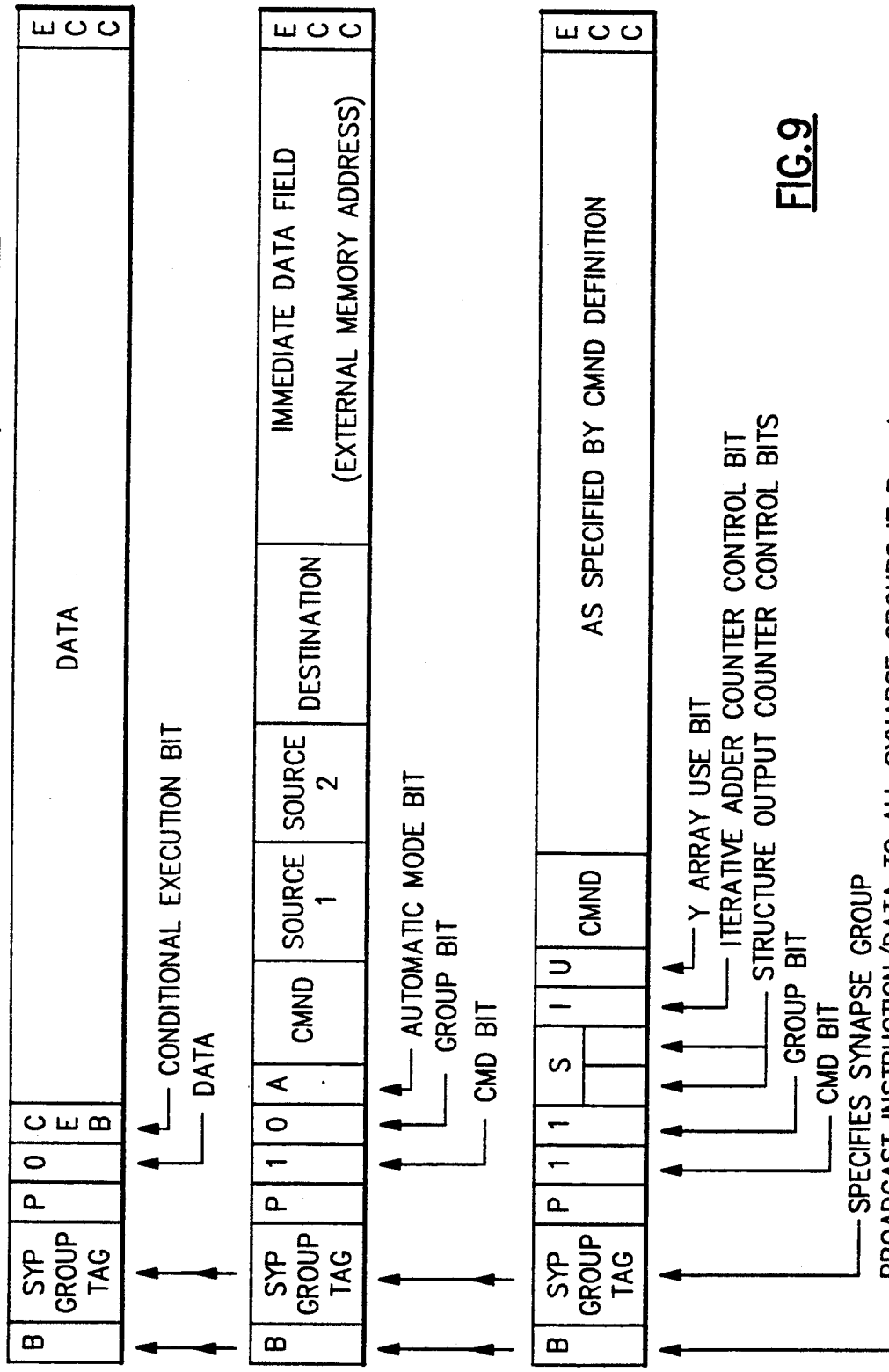
FIG. 9 shows the SYP received synapse processor group instruction/data format.

The PCAT instruction format is shown in FIG. 6; the NEP Instruction/data format is depicted in FIG. 7; FIG. 8 depicts the synapse instruction/data format as received in the NEPs; and FIG. 9 depicts the synapse instruction/data format as sent to the SYPs. The PCATs do not receive data from the NIP and only receive a node command specifying the function to be applied to incoming data from the NEPs. The NEPs receive and decode instructions sent to Levels 4, FIGS. 7, and 6, and FIG. 8. The NEPs decode the SYP instructions not only to format the SYP instructions correctly but also to control the SCATs properly. The NEP SYP group tag is a field which is loaded into a NEP register and used by the NEPs in the formatting of the synapse instructions. The first bit in the level specific instruction/data field indicates whether the information is an instruction or is to be treated as data. The second bit is maintained for future use and included to make the length of the NEP instructions/data the same as the NEP received SYP instructions/data. The third bit in a data word is the Conditional Execution Bit (CEB). The third bit in an instruction is the Auto bit defining the data flow automatic mode of operation. For NEP instructions, FIG. 7, after the third bit comes a command field, two source fields, two destination fields, and an immediate field. Both instructions and data end with ECC bits (or parity bits as determined by an error handling method).

The instructions sent to the SYPs do not need the level designation as they are at the lowest level of the hierarchy. In addition, the SYP group tag, which was loaded previously into a NEP internal register, is sent to the SYPs. The rest of the fields remain as already shown in FIG. 8. For neural network models as described in this discussion, the capability offered by having unique SYP group tags is not required and all SYP group tags are set to the same value while the synapse broadcast bit is always set to a "1". The use of different SYP group tags is reserved for future use.

Message Packet Formats

Figure 10:
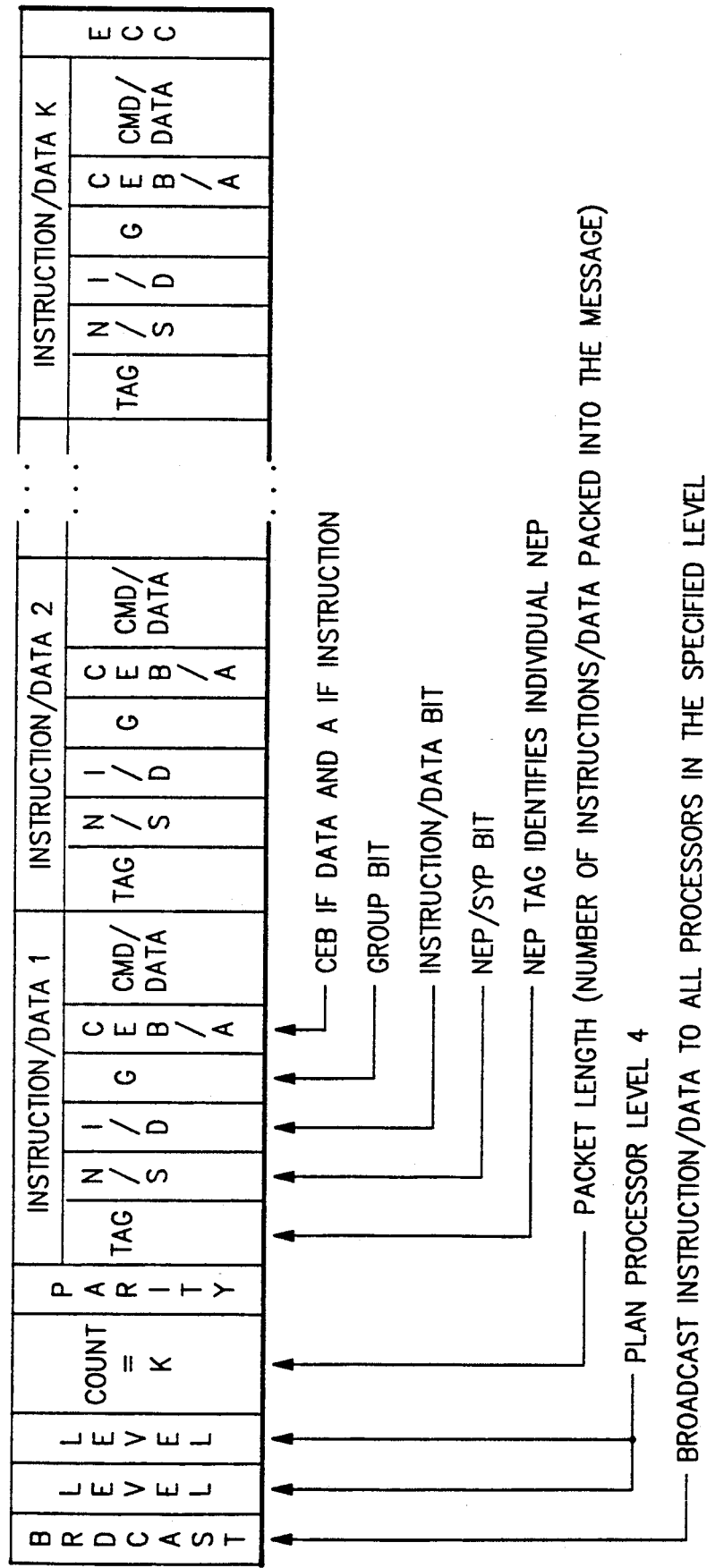
FIG. 10 shows the horizontal packet format for sending unique instructions/data to multiple NEPs.
Figure 11:
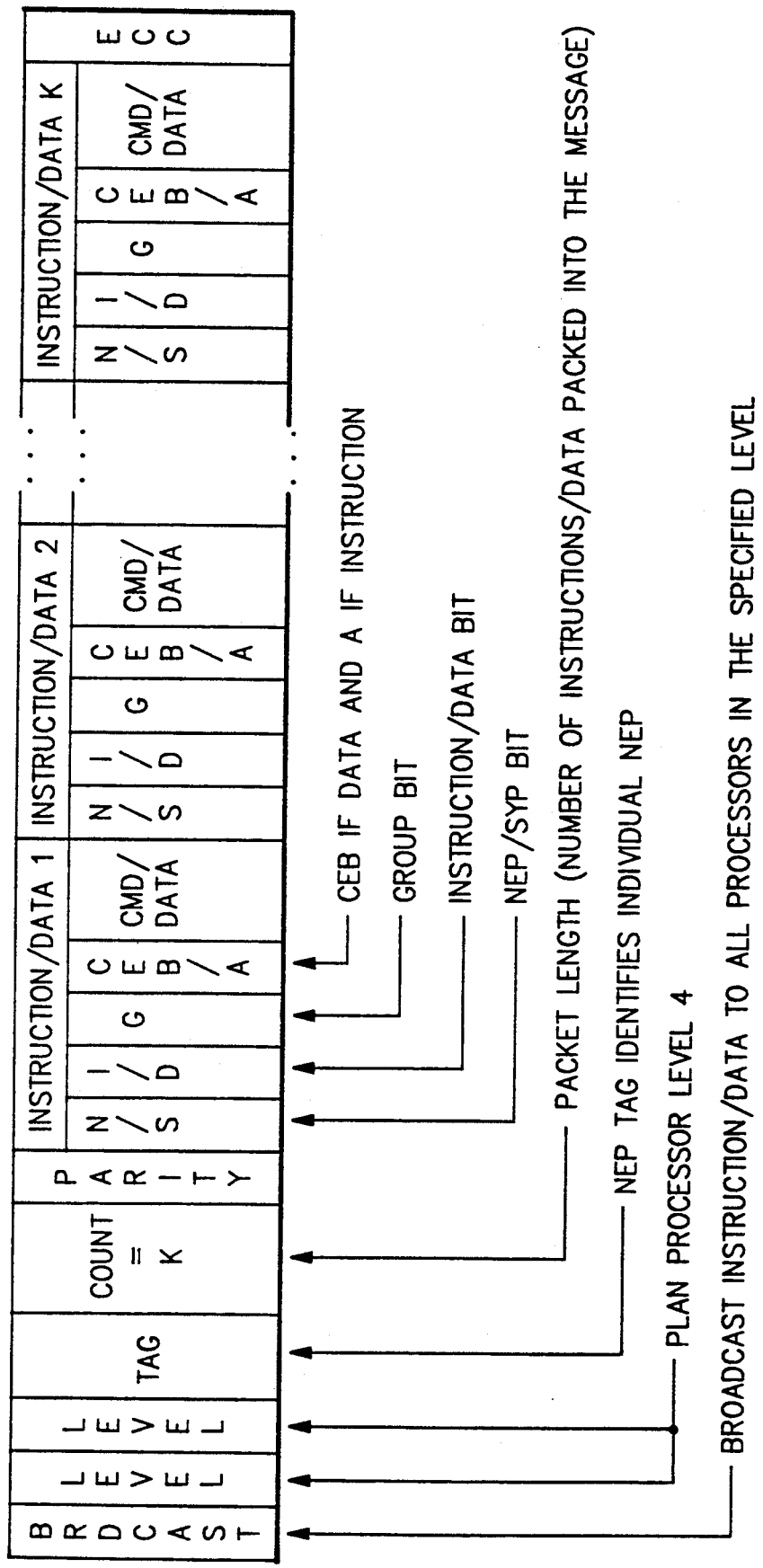
FIG. 11 shows the vertical packet format stacking multiple instructions/data in specified NEPs.

While commands and data may be processed serially, there may be implementation methods and architectural definitions in the PCAT, NEP, and SYP levels that allow multiple commands to be packed into a single format type in order to improve performance and reduce traffic over the communication medium, which in this case is the PCATs. Two possible formats will be reviewed as example implementations of this scenario. One is appropriate for the sending of up to N unique instructions/data individually to N NEPs, termed the Horizontal format FIG. 10; the other is appropriate for the sending of multiple instructions/data to individual NEPs, termed the Vertical format, FIG. 1 1. The main changes to the general format, FIG. 5, is the addition of a count field and the packing of multiple instructions/data into the message. It should be noted that both types could be implemented on -the same machine with the addition of an identifying message type field in the packet header. A new bit is included with each packed instruction/data to identify whether the instruction/data is intended for a SYP or to be used at the NEP level. This bit is identified as N/S in FIGS. 10 and 11.

LEVEL 3 PCAT DESCRIPTION

A group of Level 4 NEPs are connected by a Programmable Communicating Adder Tree (PCAT) to Level 2 for the purposes of communicating commands to the NEPs and for processing results from the NEPs. The PCATs contain a programmable ALU at each node of the tree. Each node receives a common PCAT control signal generated from the NIP which places the PCAT nodes into either a function execution mode or a communications mode which bypasses the node's execution units. Though not discussed in this discussion, the communication's path can be physically separated from the function execution path, allowing parallel operations between the two paths. In the communications mode, the NIP issues commands which contain a field indicating the destination of the command, i.e. PCAT nodes, NEPs, or SYPs. A PCAT node instruction specifies the logic function of the node. Only valid data received from Level 4 is operated on. This is a data dependent execution mode of operation. Since all selected NEPs, up to N NEPs at a time, execute in parallel and in synchronism, it is ensured that the data arriving at a PCAT node are in synchronism. The command format allows the tree to have different operations at each stage of the tree, but within a stage of the tree each node must provide the same function. In many applications, all nodes of the tree will be programmed to execute the same function and a single broadcast bit in the PCAT command format is utilized for this purpose. Broadcast PCAT commands traverse the tree loading all the nodes command register with the specified command.

Figure 12:
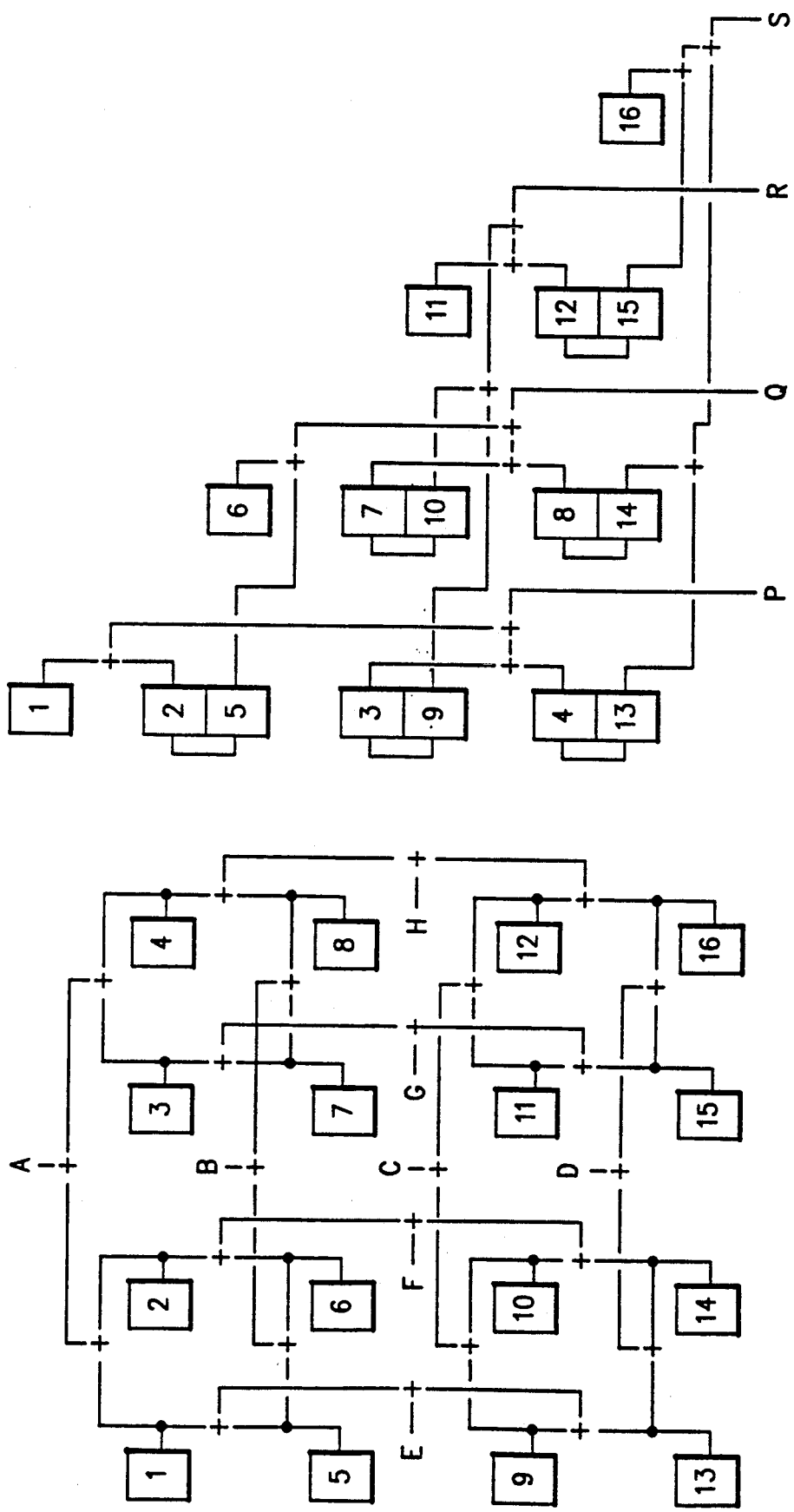
FIG. 12 shows a level 3 PCAT high level diagram.
Figure 14:
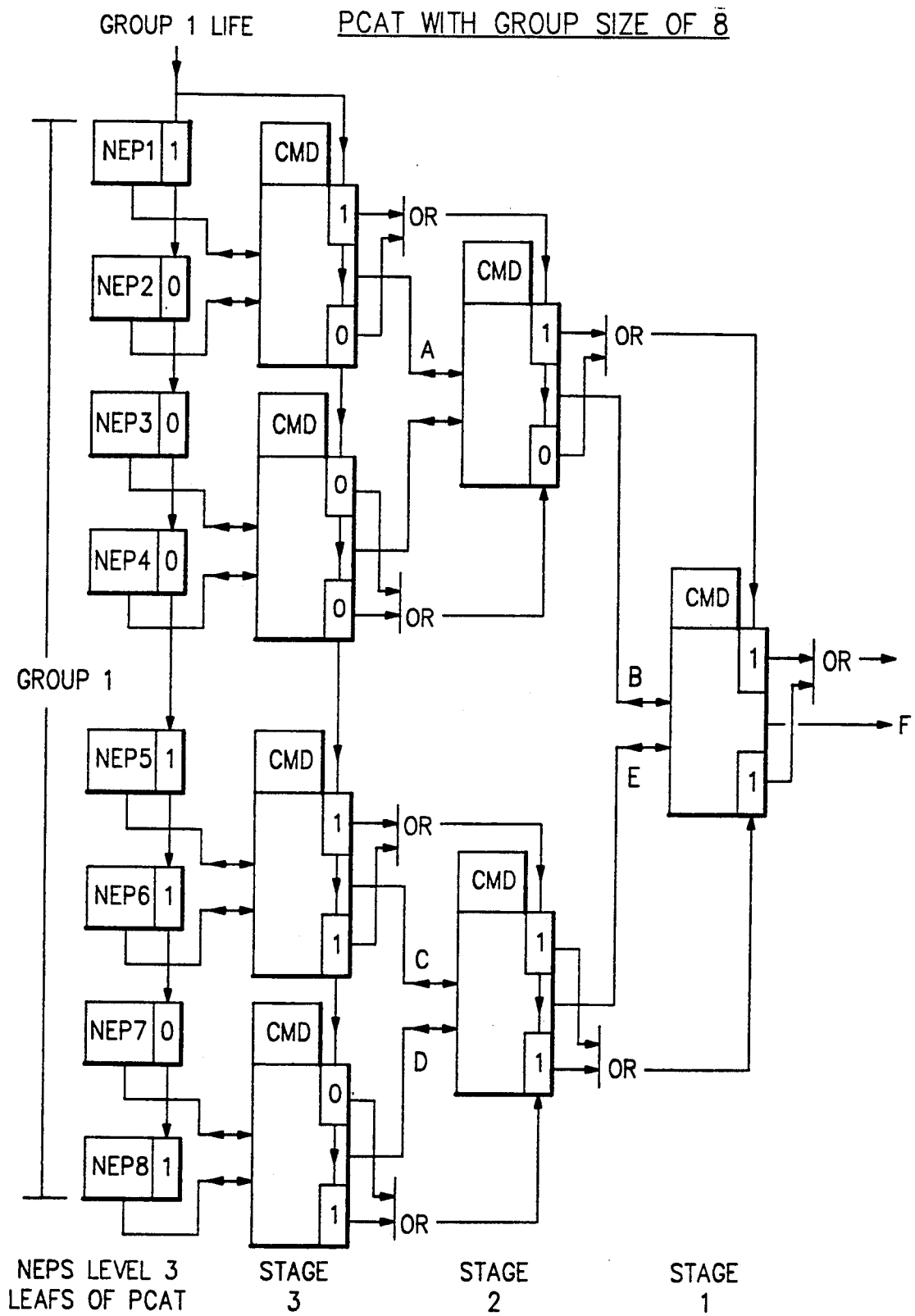
FIG. 14 illustrates a PCAT with a group size of 8.

An example grouping of NEPs, assuming N is an even power of 2, would be to place $\sqrt{N}$ NEPs into a NEP group each with a PCAT interface, resulting in $\sqrt{N}$ groups and $\sqrt{N}$ PCATs. For example, if N is 1K there would be 32 NEPs in a group with 32 PCATs; if N is 256 there would be 16 NEPs in a group with 16 PCATs. Other grouping and PCAT arrangements are equally possible depending upon system requirements, but only two structural arrangements will be discussed in this discussion. FIG. 12 presents two sixteen neuron structures, where FIG. 12A utilizes an orthogonal arrangement of communicating trees first shown in Vassiliadis SNAP 90, to be referred to as the SNAP trees, on the neurons organized into a square array of NEPs; FIG. 12B utilizes a folded array of NEPs based on the neuron/synapse folded array structure used in Levels 5 and 6 in co-pending Pechanek TSNAP 91. The programmable ALUs are indicated by the "+" signs in the tree structures. For $N=16$, the SNAP trees, FIG. 12A, have $2\sqrt{N}=2\sqrt{16}=8$ trees while the folded array, FIG. 12B, has $\sqrt{N}=\sqrt{16}=4$ trees. A feature of the folded array is the additional connections between certain, neurons, for example in FIG. 12B, 2 & 5, 3 & 9, 7 & 10, 4 & 13, 8 & 14, and 12 & 15. These dual connection paths allow each of the folded array output points, labeled P, Q, R, and S in FIG. 12B, to be completely connected to each other through the neuron level. For example by using the additional connection paths, a value can be passed from point S to neurons 4, 8, and 12 each of which is a neuron located on the other trees P, Q, and R respectively. In the same manner and in parallel:

P sends a value to neurons 1, 5, 9, and 13.
Q sends a value to neurons 2, 6, 10, and 14.
R sends a value to neurons 3, 7, 1 1, and 15.
S sends a value to neurons 4, 8, 12, and 16.

The folded array of neurons can be looked upon as another level of recursion on the network model where, for example, clusters of neurons can be completely connected to each other. Alternatively, in a different operating mode and not using the dual connection paths, points P, Q, R, and S can communicate values in parallel:

P sends a value to neurons 1, 2, 3, and 4.
Q sends a value to neurons 5, 6, 7, and 8.
R sends a value to neurons 9, 1 0, 1 1, and 12.
S sends a value to neurons 13, 14, 15, and 16.

The NIP must provide $2\sqrt{N}$ interfaces for the SNAP trees and $\sqrt{N}$ interfaces for the folded trees. The NIP issues instructions/data in parallel and in synchronism when communicating to multiple trees. Also, data is received in parallel and in synchronism on the multiple PCAT interfaces.

Figure 13:
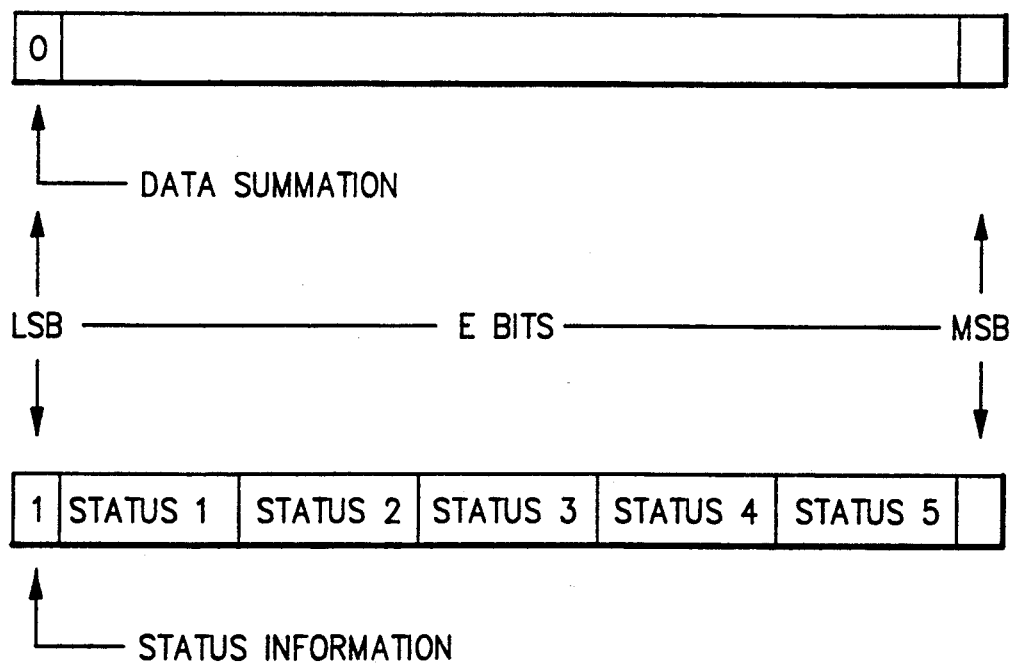
FIG. 13 shows the NEP result format.

The PCATs can be used, not only for the communication of NEP commands and data, but also for the reverse processing of results from the NEPs in each group. The types of information which are sent back to the NIP are, for example:

Successful completion of an operation
An error has occurred
Convergence testing completion status Many methods may be used for the processing of the results but only two will be reviewed here. In a first method, the NEP status values are summed on the PCATs in a method similar to that used on Levels 5 and 6 (per Pechanek SVLM 91). Each "alive" NEP in a group issues a bit string to its PCAT connecting to Level 2 utilizing a precise format such that the accumulated status from the group PCAT can be unambiguously used in the NIP to indicate the desired status. FIG. 13 depicts the format to be used. With N NEPs and $\sqrt{N}$ NEPs in a group then $\log_2(\sqrt{N})+1$ bits are used per status field with the restriction that a NEP can only inject a "0" or a "1" in its status field indicating successful completion or otherwise. For example, with $N=1K$ and $\sqrt{1K}=32$, then 6 bits are used for a status field. Each NEP can then only inject a "000000" or a "000001" onto its group PCAT. If all $\sqrt{N}$ neurons in a group are active, then a PCAT sum that is $<\sqrt{N}$ indicates a zero status situation has occurred somewhere among the $\sqrt{N}$ NEPs. On the other hand, if the group PCAT status sum is equal to 32 exactly, then all NEPs successfully completed the operation. Since the NIP knows the number of active neurons, only group PCAT status sums exactly equal to the active number of neurons indicate successful completion status. Inactive neurons inject only "0"s onto the PCAT interface. An operation may be successfully completed but not necessarily indicate all the information needed at the NIP level. For example, the convergence testing of N neurons requires both the successful completion of an indicated NEP command and the meeting of a network criterion, where all the neuron outputs must be less than or equal to some value with a minimum specified error. If any one neuron is not converged, the operation would continue at the network level but only if all neurons converged will the mode of operation on the NEPs be changed. Convergence testing occurs in both learning and in relaxation network models such as the Hopfield model. A second status bit field can be used for convergence testing status. In this manner multiple status field can be set up in a standard format of E bits, where E might be dictated by the size of the NIP data word. In the $N=1K$ example with an E of 32 bits, 5 unique status fields can be specified. Alternatively, if only two status fields are sufficient for a network model then the status data can be minimized to 2 fields improving the status response time. The NEP PCATs can also be used for the summation of data which would allow for other operations as required.

A second method of convergence testing involves the processing of a NEP bit vector. A compare function in the NEPs produce a bit indicative of convergence criteria being met in each NEP if equal to a "1". The NEP convergence bit vector is then ANDed on the PCAT resulting in the PCAT outputting a "1" indicating the NEPs in that PCAT group met the convergence criteria. The NEPs contain a bit indicating whether it is "alive" or "not alive". Prior to executing a received command, the NEP will check its "life" bit. A NEP which is "not alive" will not respond to commands or data sent to it from the NIP. There are a number of ways of providing the PCAT function based on the NEPs which are "living". For example, consider FIG. 14 in which the "life" bits are serialized to both the leaf nodes (NEPs) and last stage of PCAT, stage 3 in this example. The stage 3 PCAT processing nodes use the "life" bits to determine whether a specified function, loadable in each node, is to be executed on the incoming operands or rather whether an operand is to be passed onto the next stage of the PCAT. Both NEPs attached to a PCAT node, being "alive", i.e. both "life" bits equal to a one, indicates the specified node function is to be executed. If either NEP is "alive" but the other NEP is "not alive", then the operand associated with the "living" NEP should be forwarded to the next PCAT stage. If the NEPs, attached to a tree node, are "not living", then no operation should take place. For the succeeding stages of the PCAT, an OR of the preceding stages "life" bits are used. For example, the points labeled A, B, C, D, E, and F, FIG. 14, will generate the following functions based on the "living" NEPs.

A = NEP1 operand
B = NEP1 operand
C = $fn_3$(NEP5, NEP6)
D = NEP8 operand
E = $fn_2$(NEP8, $fn_3$(NEP5, NEP6))

$F = fn_2(NEP1, fn_2(NEP8, fn_3(NEP5, NEP6)))$

Table 1 below lists an example PCAT instruction set where the operand inputs are implied to be the "children" inputs to the node, and the output is implied to go to the next stage of the tree.

Figure 15:
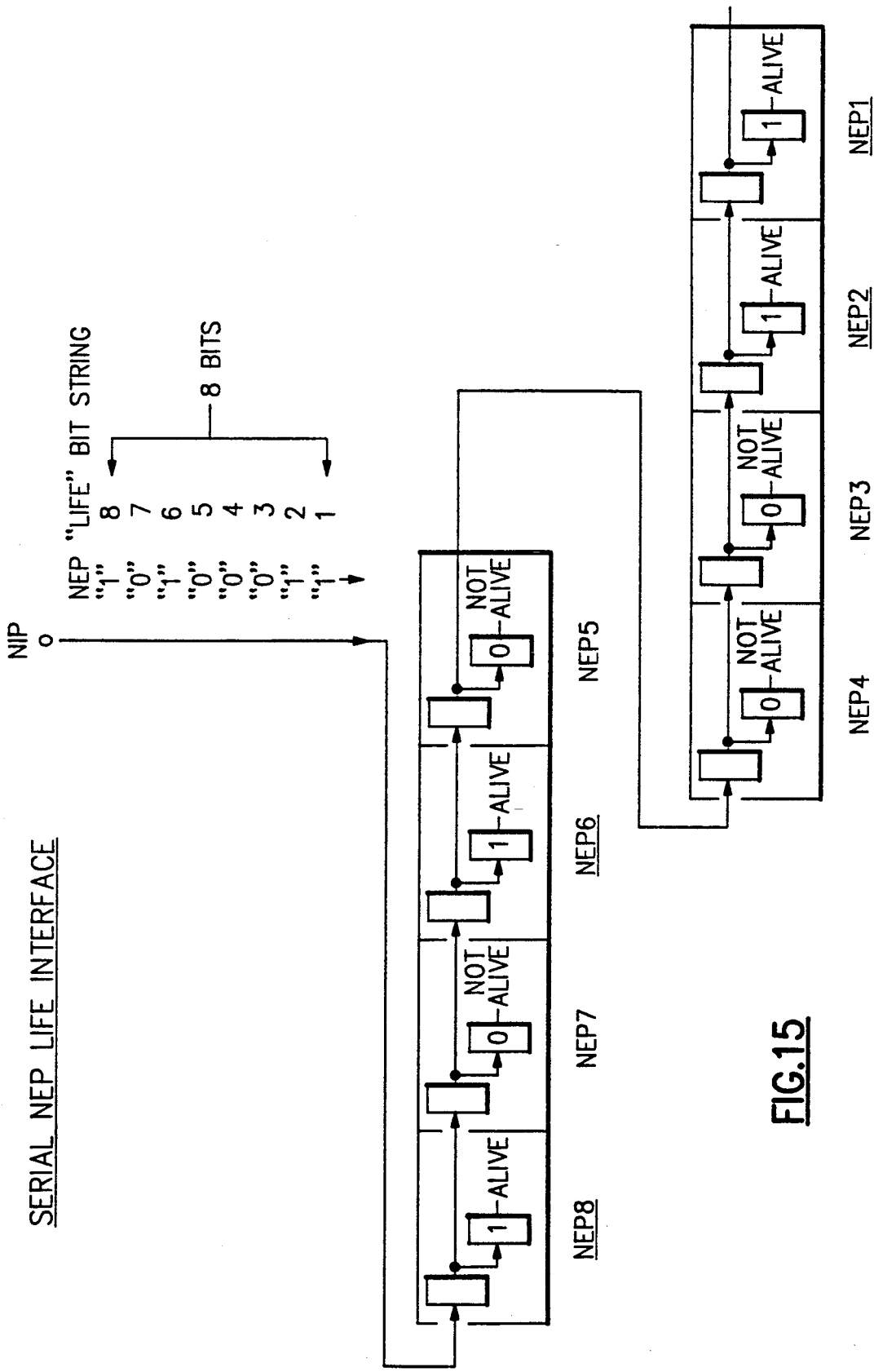
FIG. 15 shows a serial NEP "life" interface.

There is a need for temporary storage at each node if functions such as MIN, and MAX are to be supported, which requires a bit by bit compare. After the compare is competed, the data, received in an internal register, which was determined to be MIN or MAX is forwarded to the next node. If one NEP is "not alive" at a leaf node, that node must pass the "living" NEP's operand as the Min or Max value in the same manner as if both operands were "living". If this did not occur, the operands received at the next higher node would be out of synchronism.

located one bit of the group "life" shift register, which receives the "life" bit string, and the NEP "life" latch. All NEP "life" latches are parallel loaded from the "life" shift register after all the "life" bits have been serialized into the NEP group. In the example of FIG. 15, where 8 NEPs are in a group, 8 bits are serialized into the NEP "life" shift register. Only NEPs 1, 2, 6, and 8 are to be "living" neurons participating in the network emulation. The "life" bits are indicated in quotes, and the "living" neurons are highlighted. By using "life" shift registers in the groups, the "life" bits can be changed in parallel with the sending of a new command or data to a NEP as long as the "life" bit arrives in the NEP in less than or equal time it takes a NEP to receive the command/data. This method adds a shift register to the NEP group but removes the bus traffic on the PCAT that would have been associated with the setting of the "life" bits. By updating the NIP neuron scoreboard bit pattern in some desired random fashion, probabilistic network models can be facilitated. Additionally, faulty NEPs can be kept in a "not alive" state by the neuron scoreboard method.

TABLE 1

| TYPE | CMND | COMMENTS |
| --- | --- | --- |
| ARITHMETIC | ADD | PROVIDES SUMMATION OF LIVING NEP VALUES SENT TO PCAT |
| " | MIN | MIN(CHILD1, CHILD2) = OUTPUT TO NEXT TREE STAGE |
| " | MAX | MAX(CHILD1, CHILD2) = OUTPUT TO NEXT TREE STAGE |
| LOGICAL | AND, NAND, OR, NOR, EXOR, NEXOR, A&NB, N(A&NB) NA&B, N(NA&B) | BIT BY BIT LOGICAL FUNCTIONS |

PCAT EXAMPLE INSTRUCTION SET

LEVEL 4 NEP DESCRIPTION

High Level Description

The NEP array structure with PCATs provides flexibility in the selection of neurons for processing and status communications. At the NIP level there is maintained in NIP memory a scoreboard representing which NEP groups and NEPs are "alive" during an update cycle. The term "alive" means that the NEP is operational, receiving and executing commands. In addition, associated with each group, there are bits representing the "living" neurons within their group. In these locations, a "1" indicates the neuron is "alive", and a "0" indicates those neurons which are "not alive". When a NEP is "not alive" it is in an idle state but not to be considered as "dead" since an idle NEP can be brought back to "life" by a change in its "life" bit. This allows total flexibility is the selection and control of the NEPs in Level 4.

Figure 16:
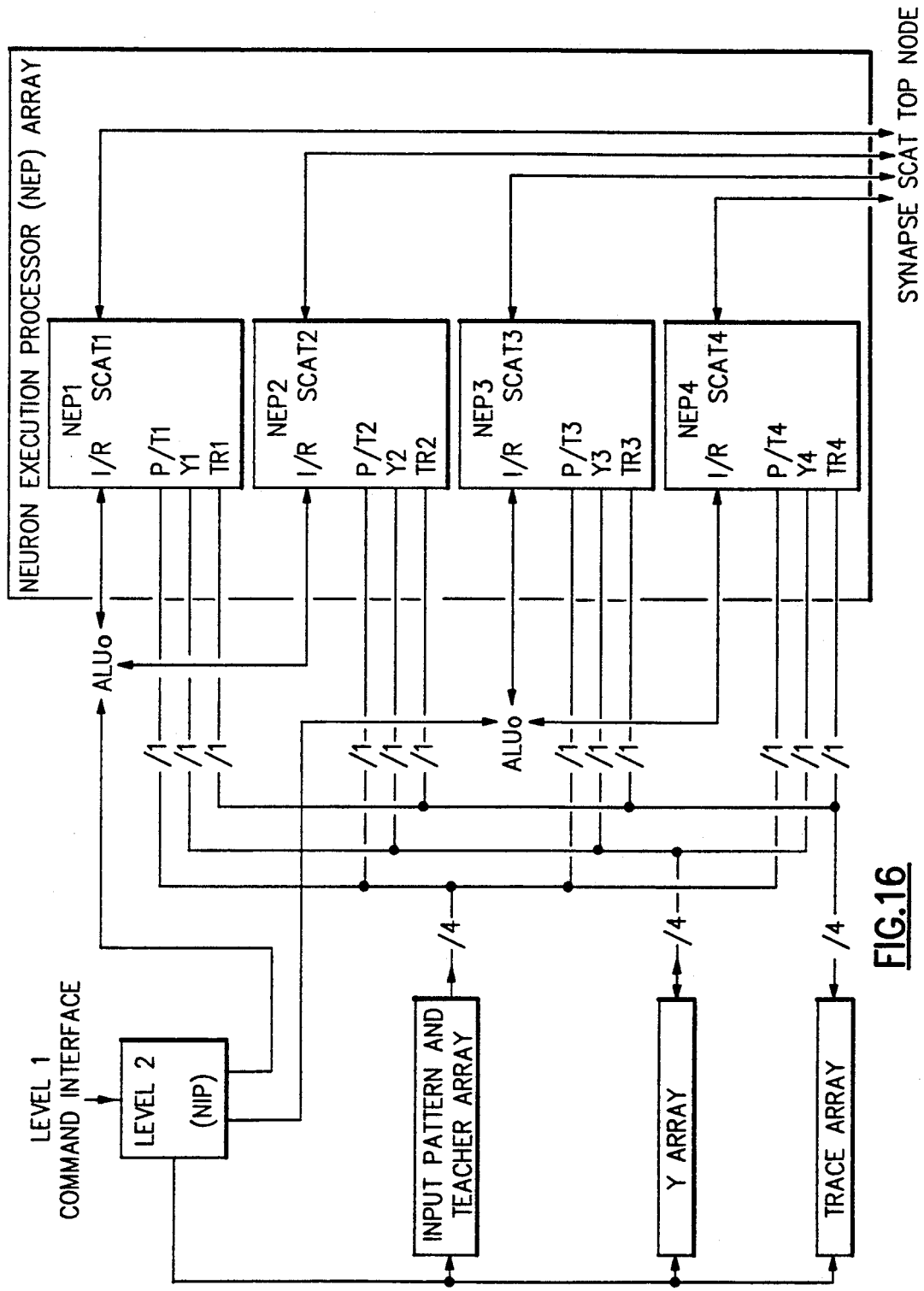
FIG. 16 shows a PLAN level 4 high level diagram.

A neuron "life" bit is maintained in each NEP to indicate whether it will be used in a network emulation or will be in an idle state. This bit is maintained until it is required to be changed. For some network models, such as the Hopfield model this bit may never change during the model's emulation and would be treated as an initialization bit. For other models, such as multilayer neural networks, this bit may change for each layer's execution and for probabilistic models, which randomly selects a neuron for updating, the "life" bit pattern may be changed every neuron update. There are a number of methods for implementing the "life" bit concept, but only one will be reviewed here. A serial interface, sourced from the NIP neuron scoreboard memory, is provided to each NEP group. By using consistent ordering of the "life" bits in the serial string, no tagging of the "life" bits would be required. The serial "life" interface is logically shown in FIG. 15. The "life" bit order in the serial bit string is created in the connected order of the NEPs. Internal to each NEP is Each NEP has an interface to an external memory which contains the storage of the input patterns and teacher patterns to be applied to a network model as well as neuron output storage and selected trace storage. Each NEP also receives data from N synapse processors through a synapse SCAT top node, SCATs in summation mode. Each NEP outputs commands/data to their N synapse processors through the same synapse SCAT top nodes, SCATs in communications mode, FIG. 16. It is assumed that for inputs received by the NEPs a flagging mechanism is utilized, such as a signal going active and staying active for the duration of the input data, to ensure the NEPs know when to begin the processing of received data. Counters, tagging mechanisms, or other synchronizing means may be used.

Since the NEPs are controlling the sending of instructions/data to the SYPs in a single instruction/data interlocked fashion, the NEPs control whether the synapse SCATs are in a summation mode or in a reverse communications mode. Additionally, the NEPs provide the external switching mechanism as required by a Scalable Virtual Learning Machine, described in Pechanek SVLM 91.

The use of the PCAT for processing status information is quick in that go/no-go status across a group of NEP can be obtained in $log_2$(group size) cycles. For many applications, the amount of status information that can be processed in this manner may not be sufficient. In anticipation of those applications, another method of obtaining NEP status can be provided in addition to the first. In each group, all the NEP's internal status registers can be connected together in a serial fashion. If for example, each NEP contained a 3 bit status register (allowing the identification of 8. different statuses per NEP), then with 32 NEPs in a group the status shift register would output a 96 bit serial string made up of 32-3 bit fields, where each field is associated with the issuing NEP in the order connected by the NEP group.

Level 4 Specific Requirements

The following list presents examples of the type of functional characteristics that are possessed by the NEPs:

1. Superset of synapse processor functions
2. Neuron output function $Y_i$ to include linear, threshold, and sigmoid types under various parameter control such as temperature T.
3. Derivative generator to produce $pA_i(1-A_i)$ where p is some constant and A is a NEP register value.
4. Capability of applying input patterns to selected NEPs as required in multilayer neural networks
5. Ability to issue instructions to the synapse processors
6. Ability to issue and receive data to/from the synapse processors
7. Ability to store selective data results in an external trace memory
8. Ability for convergence testing on generated $Y_i$s

Detailed Description with Instruction Set

Figure 17B:
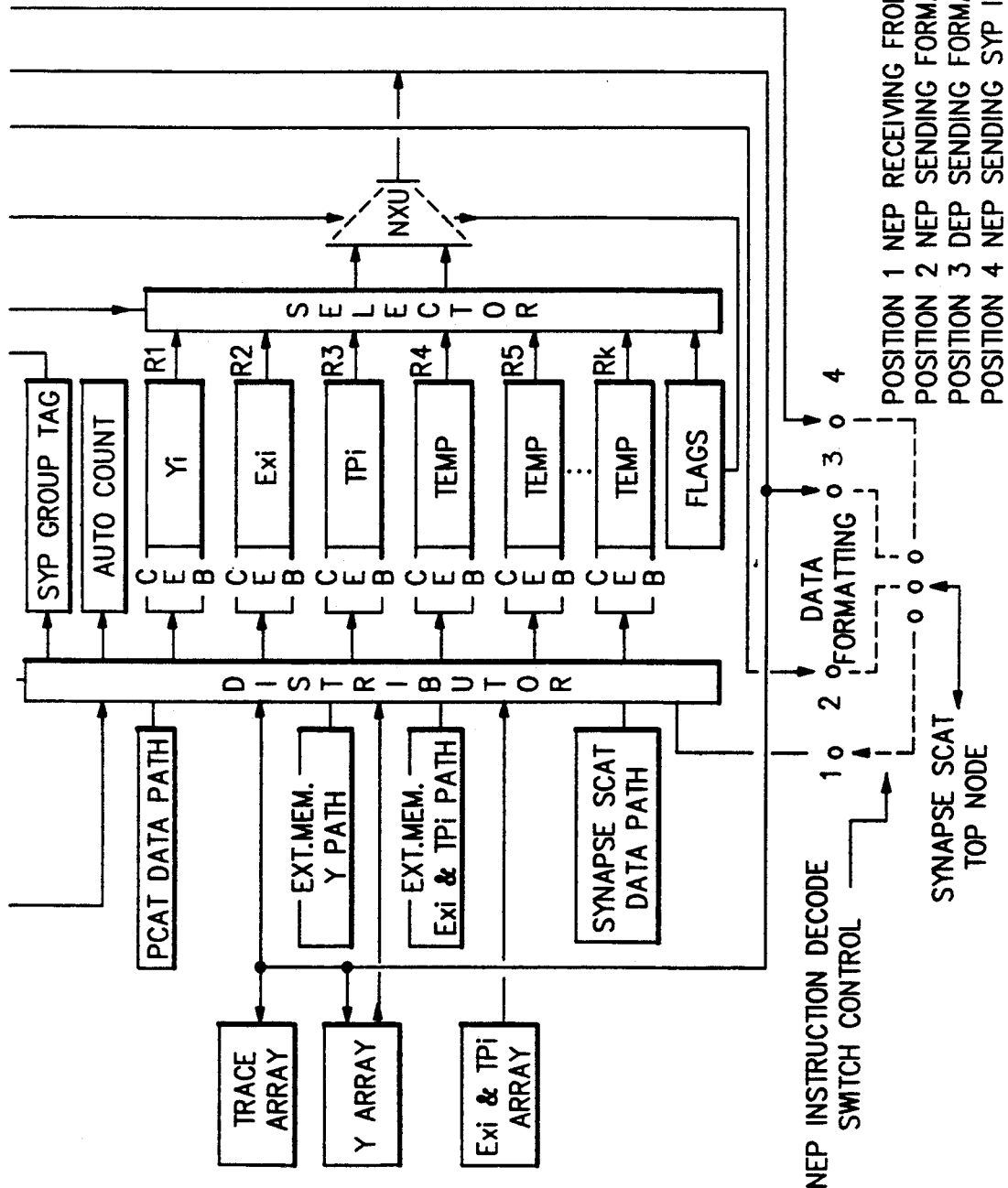

The neuron processors (NEPs) in the LEVEL 4 are architected with a super set of functions based on the SYP's instruction set. For example, the neuron processors contain both sigmoid and neuron output derivative functional capability as well as enhanced distribution and selection controls for the new source and destination points. Since the sigmoidal functional capability resides in the Level 4 processors, these processors have been referred to as Neuron Execution Processors or NEPs. A typical NEP is shown in FIG. 17 which contain the following functions: sigmoid, Y value derivative, storage arrays for Teacher Patterns, Input Patterns, Y values, and Traced values, and the full synapse processor type of instructions containing new source and destination paths. The neuron execution unit, NXU, destination register. The sending of commands/data to the synapse processors can only occur one command/data sent at a time. The completion of the operation associated with the sent command/data is signaled on the synapse SCAT back to its attached NEP. The next command/data can be sent from the NEP to its attached synapse processors interlocked by the completion signal.

The memory required by the LEVEL 4 processors is provided external to the NEP chips containing a group of NEPs. The accessing of data from the external memories can be done in a similar manner to the method used with the external arrays in Level 6 SYPs for virtual processing provided by Pechanek SVLM 91 with the addition of NEP group commands as required. The Trace array is handled differently as it represents a monitoring type of function. For example, a special trace register and compare logic could be provided in each NEP such that the register would be loaded from the NIP with the desired command that it wishes to trace. When the NEP detects it has received the specified command, the results of the command would be sent to the External Memory Trace Array under a separate addressing mechanism which allows the storage of the last X events. The Level 4 external memory would need to contain at minimum the following data:

N×P entries in Input Pattern array where P represents the number of patterns to be applied.

N×TP entries in Teacher array where TP is the number of teacher patterns to be applied in a learning algorithm.

N×V/N×2+ entries in the Y value array, where V is the number of virtual neurons, N is the number of physical neurons, and 2+ represents a minimum requirement of 2Y value entries; one for the present Y value and one for the previous Y value. Greater than two entries per neuron Y value would allow a greater history storage.

N×X entries in the Trace array where an event from all N NEPs can be stored. X represents the number of network cycles each event is to be traced.

An example bit format for a NEP instruction, FIG. 7, with N=256 is as follows:

| | |
|---|---|
| B BROADCAST BIT | → 1 BIT |
| LEVEL BITS | → 2 BITS |
| TAG | → 8 BITS ($\log_2 N$) |
| TAG PARITY | → 1 BIT |
| INSTRUCTION OR CMD BIT | → 1 BIT |
| GROUP BIT | → 1 BIT |
| AUTO BIT | → 1 BIT |
| CMD | → 5 BITS (32 COMMANDS) |
| SOURCE 1 | → 4 BITS (16 SOURCE LOCATIONS) |
| SOURCE 2 | → 4 BITS (16 SOURCE LOCATIONS) |
| DESTINATION 1 | → 4 BITS (PCAT, SCAT, EXT. MEM.) |
| DESTINATION 2 | → 4 BITS (NEP REGISTER SELECTION) |
| IMMED. DATA/EXT. MEM. ADDR | → 10 BITS (10 BIT DATA/1K VIRTUAL VALUES/NEP) |
| ECC | → 6 BITS |
| | 52 BITS | is made up of multiple functional units including the sigmoid function, and the neuron Y derivative function, some of which functions may be ROM coded functions. A Load NEP register command is a multiple word command made up of a command word and K data words which allows multiple registers to be loaded in the NEPs.

An identified data word received in the NEP input buffer when detected bypasses the NEP instruction register passing through the distributor directly to the The 10 bits in the immediate data field, as used for an external memory address, allows up to 1024 virtual values per NEP. With 256 NEPs, PLAN would support at the NEP level, 256K virtual neurons. The use of the immediate data field as an external memory address is only one mode of addressing in the NEPs. Other modes are feasible, such as utilizing the NEP chip's addressing mechanism which, in a similar manner to that used at the synapse level, is used in support of data dependent auto execution mode. Another addressing mode would be to identify an address register whose value is added to the immediate data field to generate a new external memory address. The three addressing modes, direct addressing through the use of the immediate data field, use of the internal automatic addressing mechanism, and a register plus immediate data offset addressing means, are incorporated in the example NEP instruction set depicted in Tables 2 and 3. The NEP instruction set also allows multiple destinations to be specified through the use of two destination fields. For example, it may be desirable to send a sigmoid calculation to a specific NEP register, to the SCAT, to the PCAT, and/or to External Memory or any combination of these destinations. The destination 1 field, tables 2 and 3, allows the specification of a PCAT, SCAT, or External Memory destination. The External Memories no access or access method specification, one of the three addressing modes discussed for example, is defined by the 2 bit EXTM. field within the Destination 1 field. The destination 2 field, tables 2 and 3, allows the selection of an internal NEP register or the selection of none. An instruction is considered invalid (or a NOP) if no destination is specified.

TABLE 2

NEURON PROCESSOR EXAMPLE MEMORY/REGISTER TYPE INSTRUCTIONS

| NEP CMND | *AUTO* | SOURCE 1 | SOURCE 2 | DESTINATION-1 | DESTINATION-2 | IMMED. DATA | COMMENTS |
|---|---|---|---|---|---|---|---|
| NOP | N.U. | N.U. | N.U. | N.U. | N.U. | N.U. | NO OPERATION |
| LOAD NEP REG (LNR) | N.U. | PCAT OUT, | # OF REGISTERS TO BE LOADED | N.U. | (1st REG.) R1,R2,...,Rk, AUTO-COUNT, SYP-GROUP-TAG, CEBs | N.U. | THE DATA TO BE LOADED FOLLOWS THE COMMAND. THE 1st REG. LOADED IS SPECIFIED BY DESTINATION-2. THIS ALLOWS MULTIPLE NEP REGS TO BE LOADED IN THE ORDER SPECIFIED THE CEB BITS ARE PACKED INTO ONE DATA WORD-(R1CEB,R2CEB,..., RkCEB,X,X,...,X). |
| PATH | N.U. | N.U. | N.U. | DATA FROM PCAT TO R1,R2,...,Rk | DATA FROM SCAT TO R1,R2,...,Rk | N.U. | SET THE DATA PATH REGISTER TO THE DESTINATION REGISTER. DATA BEING RECEIVED FROM A TREE WILL BE SENT TO THE REGISTER SPECIFIED BY THE PATH. |
| EMPATH | N.U. | N.U | N.U. | DESTINATION 2 (Exi PATH) R1,R2,...,Rk | DESTINATION 3 (TPi PATH) R1,R2,...,Rk | N.U. | PATH FOR DATA READ FROM EXTERNAL MEMORY TO REGISTER R1, R2, ..., Rk DESTINATION. REQUIRED FOR THE DATA DEPENDENT AUTOMATIC MODE. |
| READM | N.U. | NEP EXT. MEM. Y,Exi,TPi | # OF REGISTERS TO BE READ | PCAT SCAT EXTM. | (1st REG.) R1,R2,...,Rk, | STARTING NEP EXT. MEM. ADDRESS | THIS ALLOWS MULTIPLE NEP REGS TO BE LOADED FROM EXTERNAL MEMORY IN THE ORDER SPECIFIED. DATA MAY BE SENT TO PCAT, SCAT, OR REGISTER SET. ONLY ONE WORD AT A TIME MAY BE SENT TO THE SCAT. |
| WRITEM | N.U. | (1st REG.) R1,R2,...,Rk | # OF REGISTER TO BE WRITTEN | PCAT SCAT EXTM. N.U. | N.U. | STARTING NEP EXT. MEM. ADDRESS | |
| SENDSYPDATA | N.U. | R1,R2,...,Rk, IMMED. DATA, NEP EXT. MEM. | N.U. | SCAT | SCAT | NEP EXT. MEM. ADDRESS | SENDS DATA ONLY TO SYNAPSE PROCESSORS ONE WORD AT A TIME - TO LOAD MULTIPLE SYP REGISTERS MUST CHANGE THE SYP PATH EACH TIME |

TABLE 3

NEURON PROCESSOR EXAMPLE ARITHMETIC AND LOGICAL TYPE INSTRUCTIONS

| NEP CMND | *AUTO* | SOURCE 1 | SOURCE 2 | DESTINATION-1 | DESTINATION-2 | IMMED.DATA | COMMENTS |
|---|---|---|---|---|---|---|---|
| LINEAR NEURON FN | $\theta$=NO 1=AUTO | R1, R2,..., Rk, IMMED.DATA | R1, R2,..., Rk, IMMED.DATA | PCAT SCAT EXTM. | R1, R2,..., Rk OR NONE | DATA OR NEP EXT.MEM. ADDRESS | Y = A*X |
| THRESHOLD NEURON FN | $\theta$=NO 1=AUTO | R1, R2,..., Rk, IMMED.DATA | R1, R2,..., Rk, IMMED.DATA (THRESHOLD) | PCAT SCAT EXTM. | R1, R2,..., Rk OR NONE | DATA OR NEP EXT.MEM. ADDRESS | Y = SOURCE-1 * SOURCE-2<br>Y = $\theta$ IF SOURCE-1 < SOURCE-2 (THRESHOLD TEST)<br>Y = 1 IF SOURCE-1 $\geq$ SOURCE-2 (THRESHOLD TEST) |
| SIGMOID NEURON FN | $\theta$=NO 1=AUTO | R1, R2,..., Rk, IMMED.DATA | R1, R2,..., Rk, IMMED.DATA (TEMPERATURE) | PCAT SCAT EXTM. | R1, R2,..., Rk OR NONE | DATA OR NEP EXT.MEM. ADDRESS | $Y = 1/\left(1 + e^{-\frac{z}{T}}\right)$<br>WHERE:<br>z = SOURCE-1 AND<br>T = SOURCE-2 (TEMPERATURE) AT A MINIMUM $\theta \leq \rho \leq 7$ |
| pR(1-R) DERIVATIVE (YDR) | $\theta$=NO 1=AUTO | R1, R2,..., Rk, IMMED.DATA | R1, R2,..., Rk, IMMED.DATA (p) | PCAT SCAT EXTM. | R1, R2,..., Rk OR NONE | DATA OR NEP EXT.MEM. ADDRESS | |
| MPY | $\theta$=NO 1=AUTO | R1, R2,..., Rk, IMMED.DATA | R1, R2,..., Rk, IMMED.DATA | PCAT SCAT EXTM. | R1, R2,..., Rk OR NONE | DATA OR NEP EXT.MEM. ADDRESS | |
| ADD | $\theta$=NO 1=AUTO | R1, R2,..., Rk, IMMED.DATA | R1, R2,..., Rk, IMMED.DATA | PCAT SCAT EXTM. | R1, R2,..., Rk OR NONE | DATA OR NEP EXT.MEM. ADDRESS | |
| CMPR | $\theta$=NO 1=AUTO | R1, R2,..., Rk, IMMED.DATA | R1, R2,..., Rk, IMMED.DATA | PCAT SCAT EXTM.<br>N.U. N.U. | CMP FLAGS LT, GT, EQ | DATA | LT = SOURCE-1 < SOURCE-2<br>GT = SOURCE-1 > SOURCE-2<br>EQ = SOURCE-1 = SOURCE-2 |
| MIN | $\theta$=NO 1=AUTO | R1, R2,..., Rk, IMMED.DATA | R1, R2,..., Rk, IMMED.DATA | PCAT SCAT EXTM. | R1, R2,..., Rk OR NONE | DATA OR NEP EXT.MEM. ADDRESS | MIN(SOURCE1, SOURCE2) = DESTINATION |
| MAX | $\theta$=NO 1=AUTO | R1, R2,..., Rk, IMMED.DATA | R1, R2,..., Rk, IMMED.DATA | PCAT SCAT EXTM. | R1, R2,..., Rk OR NONE | DATA OR NEP EXT.MEM. ADDRESS | MAX(SOURCE1, SOURCE2) = DESTINATION |
| AND, NAND OR, NOR, EXOR, NEXOR, A&NB, N(A&NB) NA&B, N(NA&B) | $\theta$=NO 1=AUTO | R1, R2,..., Rk, IMMED.DATA, CMP FLAGS, CEB BIT VECTOR | R1, R2,..., Rk, IMMED.DATA, CMP FLAGS | PCAT SCAT EXTM. | R1, R2,..., Rk, CEB BIT VECTOR OR NONE | DATA OR NEP EXT.MEM. ADDRESS | CEB BIT VECTOR = (CEB1 CEB2 ... CEBk)<br>WHERE: CEBx = CEB BIT FOR REGISTER Rx |
| INV | $\theta$=NO 1=AUTO | R1, R2,..., Rk, IMMED.DATA, CMP FLAGS, CEB BIT VECTOR | N.U. | PCAT SCAT EXTM. | R1, R2,..., Rk, CEB BIT VECTOR OR NONE | DATA OR NEP EXT.MEM. ADDRESS | CEB BIT VECTOR = (CEB1 CEB2 ... CEBk)<br>WHERE: CEBx = CEB BIT FOR REGISTER Rx |

*IF SOURCE 1 OR 2 SPECIFY IMMEDIATE DATA THEN THE EXTM. FIELD OF DESTINATION-1 IS IGNORED.

LEVEL 5 SCAT AND LEVEL 6 SYP DESCRIPTION

A complete detailed description of the LEVEL 5 and 6 processor arrays can be found in co-pending application Pechanek SVLM 91.

Each NEP controls N SYPs in that the SYPs only execute instructions received from the synapse SCATs which are sourced by the NEPs. Synapse SCATs do not contain a programmable ALU at each tree node but rather a simple bit-serial adder and a reverse communication switching mechanism. Obviously, the PCAT concept can be extended to the synapse SCAT level if required. By operating both levels 4, 5, and 6 in a control flow sequential manner with a data flow execution mechanism, synchronization and control problems are minimized in the two layers with the largest number of processors.

As mentioned previously, all Ns were assumed to be even powers of 2 for simplicity of discussion. It should be noted, however, that N does not need to be a power of 2. The implications to the machine organization primarily concerns the level 3 PCATs. The number of level 3 PCATs is based upon some grouping of Neuron Execution Processors per PCAT. The example for N NEP's, in VIRTUAL NEUROCOMPUTER ARCHITECTURES FOR NEURAL NETWORKS, U.S. Pat. No. 5,243,688, used the square root of N PCATs. Another example where N is not a power of 2 uses one PCAT tree interfacing at N leaf node level 4 processors. The number of level 4 NEPs is N, the number of level 5 trees is N, and the number of level 6 synapse processor is N*N. These relationships do not vary when N is not a power of 2.

HOPFIELD TSP EXAMPLE

Hopfield, in his 1985 paper Hopfield 85, outlined how a neural network can be applied to solving NP complete/hard type problems. His example of the Traveling Salesman Problem has become a classic and has been investigated by numerous researchers, for example in Ramanujam 88, Dair 88, and Brandt 88. The basic steps used by these researchers to apply neural networks to solve problems is as follows:

1. Choose a problem to neural network mapping which defines the relationships between the problem and the network's inputs, outputs, weights, and network structure.
2. Choose an energy function, based on the problem to neural network mapping chosen, such that a minimum value of the energy function corresponds to "best" solutions to the problem. This is usually done by defining a general energy function for the problem when no constraints are present and then adding penalty terms which degrade the energy if the constraints are violated. The determination of the constraints, just like the energy function, is problem specific.
3. The energy function is used to compute the connectivity weights and any input bias terms required. Once calculated these become fixed values and are representative of the specific problem to be solved.
4. The network can be excited by setting up initial neuron state values or by providing external inputs. The method and value of the inputs must be determined to set up the problem on the network. These input values are based on the problem mapping chosen.
5. Run the network to equilibrium. The stable equilibrium state output values represent a possible solution to the problem. This solution is not guaranteed to be the optimum solution unless it is shown that the energy function as defined has only one minimum value.

The TSP problem is stated as given M cities which must be visited, a salesman desires to schedule his visits to the M cities such that he will take the shortest path possible and still visit each city only once and return to the starting city. The total number of possible paths which the salesman can choose is M! Depending upon the starting position, this total number can be divided by M by assuming one unique starting position. For example, given 4 cities $4! = 4 \cdot 3 \cdot 2 \cdot 1 = 24$. But given only one starting point, the number reduces to $M!/M = (M-1)$ or in this case 6. Included in the path count are the same paths but listed in reverse order. By assuming these are equivalent paths, the total path count can be reduced further by a factor of two, so that the final number of unique tours is given by $(M-1)!/2$. This is a large reduction but the result still represents a large number as M increases, for example:

m=4, # unique tours=3
M=8, # unique tours=2,520
M=16, unique tours=$6.53837184 \times 10^{11}$

Hopfield TSP Network Mapping to Plan

Figures 18, 19:
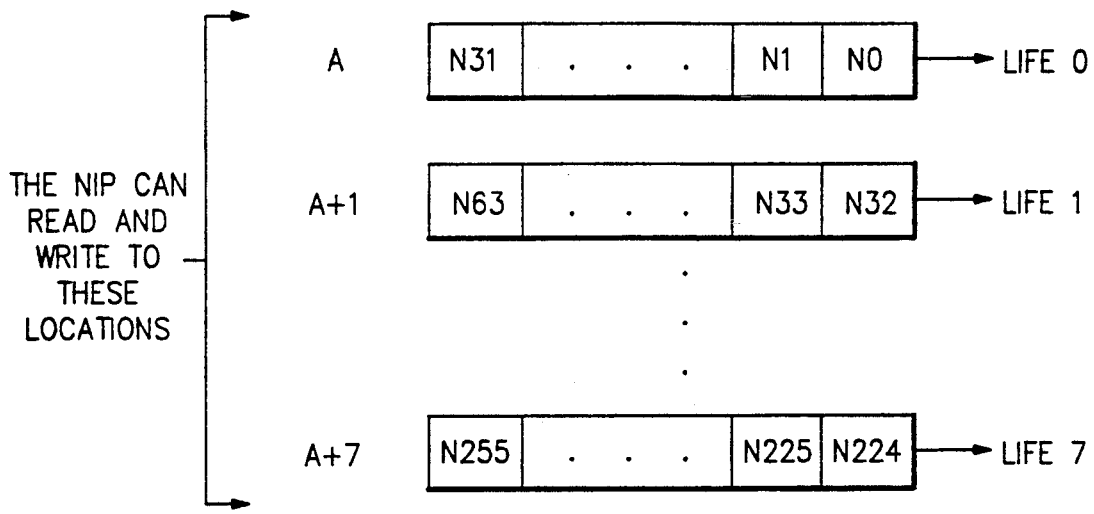
FIG. 18 illustrates a $5 \times 5$ neural network valid 5 city path of the traveling salesman's problem.
FIG. 19 illustrates a NEP "life" scoreboard serial interface.

On the Hopfield TSP network, an M city tour problem is mapped onto an $M \times M$ neural network where the rows represent the cities on the tour and the columns represent the position occupied on the tour. Each city can occupy one position out of M possible positions on a path. FIG. 18 shows a valid 5 city path mapped onto a $5 \times 5 = 25$ neuron completely connected neural network. The output of the neural network should have "strong" values, i.e. close to "1" or "0", corresponding to valid city/position neurons on a solution path. The neuron output state follows the sigmoid output function based on the sum of the weighted inputs to the neuron. To run the network, the neuron states can be initialized to some input pattern instead of using external inputs to apply the pattern. The interconnection weights are generated from an energy function specifically developed for the problem to be solved, in this case based on the city to city distance matrix. Once the network model has been initialized to some energy state it is released, running dynamically until it reaches some equilibrium state, which should represent a solution to the original problem.

The Hopfield TSP model example will use the automatic mode of operation of the NEPs and SYPs for performance reasons. After initialization of the network model on PLAN, which includes the loading of the connection weights, generation of initial Y values, and loading the number of update cycles into the NEP auto count registers, etc., the NIP begins the execution of the neural network model by sending a synapse multiply automatic mode command, MPYA, to be loaded into the "living" NEP's registers. Each "living" NEP then sends the MPYA command to all of its attached N synapse processors through the synapse SCATs. After receiving the MPYA command, the synapse processors do the multiply and forward the multiplication results to their synapse SCAT which converges a sum of product result to the "living" NEPs. While the synapse processors are active, the NIP forwards an automatic sigmoid command to the NEPs. Upon receiving notification that the sum of products result is available from the synapse SCAT and has been stored in a specified NEP register, the NEP will generate the next neuron value through the sigmoid generator and, if the auto count is not zero, will automatically forward the sigmoid result back to the synapse processors. The auto count in the NEPs indicate the number of cycles in which this should occur. After completion of the specified number of cycles, the NEPs do an individual convergence test of the neuron Y value being close to either a "0." or a "1". The NEPs forward the result to the PCAT for a group convergence test. The NEPs additionally send a command to the synapse processors, such as a NOP command, to stop the automatic mode of operation. The sigmoid result is also stored in Level 4's external memory. The NIP monitors the group PCAT convergence test for all "1"s indicative of full network convergence. If full network convergence is indicated by obtaining all "1"s on the PCATs, the NIP reads out the neuron values from Level 4 external memory to determine the path or to do further convergence testing if required. If all neurons have not reached a "0" or "1" value, then the NIP can load a new count value into the NEPs and start the network into emulation mode again, continuing until convergence is reached or non convergence is determined.

A number of assumptions must be made to present this example. The assumptions pertain to the Travelling Salesman Problem (TSP), PLAN, and each level within PLAN.

Assumptions:
Problem:
  16 city problem
  16×16=256 neuron mapping
  Completely connected network
  65,536 Connection weights
  User specifies:
    Number of network update cycles to run before a convergence test is done.
    Specification of the Δt sampling parameter (per Hopfield 85).
    Specification of T=temperature sigmoid gain control parameter (see Hopfield 85).
PLAN
  Direct emulation mode (no virtual processing)
  256 NEPs required
  65,536 SYPs required
  $\sqrt{N} = \sqrt{256} = 16$ folded PCATs to be used
  32 bit word length used in each level
NIP SPECIFIC At the NIP level, a number of assumptions must be made representing examples of implementations. NIP instructions and methods of formatting both data and instructions are assumed in order to demonstrate how a neural network model, such as the Hopfield TSP, can be modeled on PLAN.

The NEPs in a "life" group are connected together in a "daisy chain fashion" by a serial "life" interface. A NEP "life" bit determines whether the NEP is "alive", responding to instructions/data it receives, or "not alive", in a no response mode. In the NIP, one set of 8 consecutive memory addresses are set aside from the NIP memory address space for the NEP "life" scoreboard, where "1" defines a "living" NEP and a "0" defines a "not living" NEP. In this example implementation, the scoreboard interfaces in the following manner, FIG. 19, to each of the eight serial "life" interfaces to the "life" groups of NEPs. Assume the NEPs are numbered from 0 to 255 and the life groups are numbered from 0 to 7. A hardware interface at the NIP level under NIP command control sends the "life" bits to the NEPs. Two forms of the "life" command are envisioned:

TOLIFE#: Sends selected # life bit string (1 of 8) to one "life" group of 32 NEPs.

TOLIFE ALL: Sends all 8 life bit strings to 8 "life" groups of 32 NEPs in each "life" group.

The Hopfield TSP modeled on PLAN requires the initialization of both the neuron Y values and the connection weights. The connection weights are required at Level 6 SYPs only, and the Y values are used at both Level 4 NEPs and Level 6 SYPs. One way of initializing both the Y values and the connection weights is through calculations at the NIP Level 2 or at the Host Level 1 and loading the values into the external memories of both Levels 4 and 6. If the application allows it, an algorithmic method may be determined which utilizes the processors at a particular level to calculate their own initial values. Though not discounted, this method will not be explored in the TSP example. It will be assumed that the connection weights are calculated at Level 1 or 2 and loaded into Level 6 external memory where the SYPs can read the weight values into their internal registers for processing. Two other methods exist for the initialization of the Y values, both of which will be briefly discussed.

1. Use the immediate data field in the NEP and SYP commands to store an initial Y value. The first multiply used in the SYPs would contain the Y value in the MPY immediate data field. After the first update of the network model, the newly created Y values would be stored in the Y value register in the SYPs, and the next multiply command would specify this Y value register for the next multiplies. A disadvantage of this approach is that the resolution attainable with the immediate data field is less than that readily available in a full 32 bit data word.

2. Another approach, offering full precision, is to create the N initial Y values and load them into the register space and/or the external memory of the N NEPs and the $N^2$ SYPs.

Method 2 above will be described in more detail. First it is assumed that 256 memory locations are set aside from the NIP memory address space. The 256 locations will be partitioned into 16 groups of 16 addresses each. Each NEP group will have a hardware interface to a PCAT, FIG. 20. In this way each PCAT will be associated with 16 words in NIP memory. The NIP may read or write to these locations. The tag register internal to each NEP and SYP is assumed to be initialized at PLAN power on time via an LSSD path. Each NEP is assigned a tag from 0 to 255; one unique tag per NEP. All SYP tags are initialized to the same value. The use of different SYP group tags is reserved for future use. Four forms of a NIP send NEP data command are discussed next. Prior to the sending of data to either NEPs or SYPs, a PATH command must be sent to identify the destination point for received data. Alternatively, the destination register could be appended to the SEND command and the Level 2 hardware interface could cause the sending of a PATH command, specifying the register to be sent, assuming of course that the same destination register in each NEP is desired. The NEPs data may also be sent via a LOAD NEP REG command.

1. SEND DATA NEP #: The data word to be sent to the selected NEP follows this command, i.e. the SEND NEP # is a two word instruction. B="0" and the selected NEP # is added to the starting address of the 256 word memory and used as the tag to be sent to the NEPs. Only one PCAT is active.
2. SEND DATA NEP SAME The data word to be sent to all NEPs follows this command, i.e. the SEND NEP SAME command is a two word instruction. B="1", and all PCATs are active sending the same data word on all PCATs.
3. SEND DATA NEP GROUP: B=1 and all PCATs are active, but a different word is sent down each PCAT. The first word in each group of 16 memory words is loaded by the NIP with the desired word to be sent on each PCAT interface. Each group of 16 NEPs will receive a unique word. If all 16 words are equal, this command is the same as SEND DATA NEP SAME.
4. SEND DATA NEP DIFFERENT: B=0 and all PCATs are active. Each PCAT will send 16 data words down their tree by loading one memory location at a time per transfer from the memory group of 16 locations. Each tag will be unique such that after 16 transfers with 16 PCATs operating in parallel the total 256 word memory will be transferred. Each NEP will check its tag field and only load the appropriate data with a matching tag.

Figure 20:
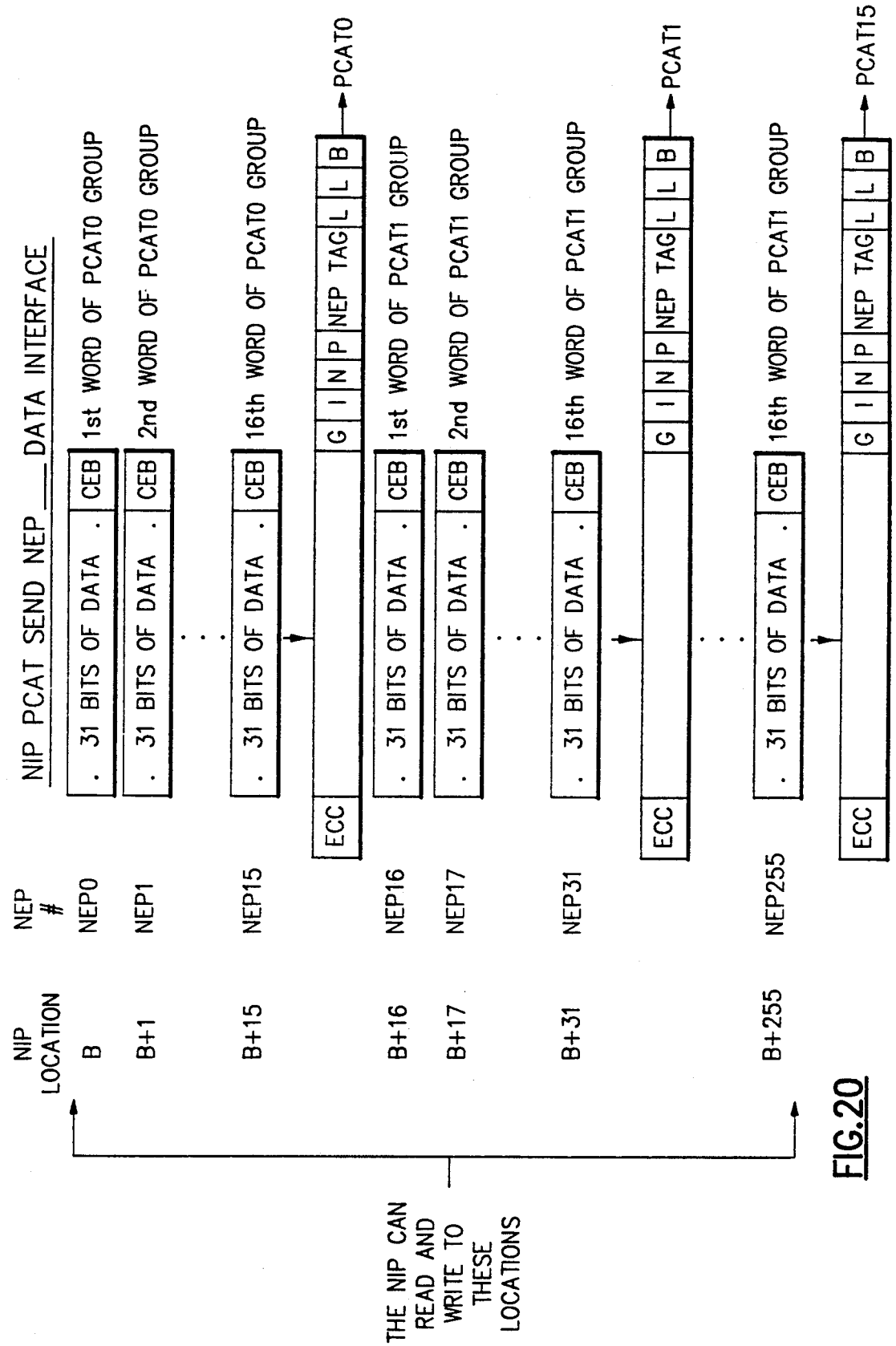
FIG. 20 shows a NIP PCAT send NEP_DATA interface.

It is assumed that instructions to be sent to the synapse processors can be handled in a similar manner to the approach taken with data as depicted in FIG. 20. For the TSP example, an analogous SEND INSTRUCTION NEP SAME format will be used where the instruction to be sent to all SYPs follows the command, i.e. the SEND INSTRUCTION NEP SAME command is a two word command. B="1" and all PCATs are active sending the same instruction to all NEPs. The "living" NEPs will format the synapse instruction and send it down to the attached synapse processors. An example of the multiply command to be sent to the synapse processors is shown in FIG. 21.

PROGRAM

1. Calculate the weights and load into external Level 6 memory
2. Calculate the initial NEP Y values
3. Send "life" bits
4. Send NEP and SYP PATH commands to set up destination registers
5. Send initial Y values to both Levels 4 and 6 loading selected registers
6. Adjust PATHs if required
7. Load Auto count register in NEPs
8. Set up PCATs for an AND function
9. Send MPYA to all synapse processors
10. Send Sigmoid function instruction to NEPs
11. Send NEP Compare 0 command
12. Send NEP compare 1 command
13. Send NEP OR command to OR the LT, GT, and EQ Flags which resulted from the previous compare commands with the PCAT as a destination.
14. Put PCATs into a function execution mode changing it from the communications mode of operation.
15. NEPs upon completion of specified count of network updates as dictated by the auto count now execute the stored compare and OR commands.
16. PCATs respond with the AND of the NEP OR convergence test values
17. NIP determines the next action.

While we have described our preferred embodiments of our inventions it will be understood that those skilled in the art, both now and in the future, upon the understanding of these discussions will make various improvements and enhancements thereto which fall within the scope of the claims which follow. These claims should be construed to maintain the proper protection for the inventions first disclosed.

What is claimed is:

1. A computer system apparatus having a scalable hierarchical processing architecture for the emulation of neural networks, having V neurons, where V represents the number of virtual neurons, in an N neuron structure, where N represents the number of physical neurons, and where N and V are integers greater than zero with V greater than or equal to N, comprising:
   a Level 1 processor including a host processor,
   a Level 2 processor including a Neuron Instruction Processor (NIP),
   N Level 4 processors including Neuron Execution Processors (NEPs),
   a Level 3 programmable function and connection processor interface between the NIP and the N NEPs,
   $N^2$ level 6 processors including SYnapse Processors (SYPs), and
   N Level 5 processors including Synapse Communicating Adder Trees (SCATs) for providing an interface between the N NEPs and the $N^2$ SYPs, whereby each NEP controls N SYP's.

2. The apparatus according to claim 1 wherein the N neuron structure further comprises memory storage means for storing connection weights and neuron values ("Y") for V neurons, the storage means separate from but directly accessible by the NEPs and SYPs.

3. The apparatus according to claim 1 wherein the NIP comprises a microcoded controller that
   executes instructions received from the host processor,
   formats and issues tagged instructions and data to the Level 3 interface, the Level 4 processors, the Level 5 processors, and the Level 6 processors, where the tagged instructions indicate a destination processing level, and
   receives processed data from the Level 3 interface.

4. The apparatus according to claim 3 wherein the NIP further comprises a bit for each NEP and a bit for groups of NEPs that indicate whether a corresponding NEP or group of NEPs is operational, able to receive instructions and data, and execute instructions, or is not operational.

5. The apparatus according to claim 4 wherein the NIP further comprises an interface to the groups of NEPs for transferring the bits to grouped NEPs under an NIP microcode control.

6. The apparatus according to claim 3 wherein the tagged instructions and data comprises a broadcast bit (B), Level destination address bits, and level specific tag bits, wherein if B is active processors at the destination specified by the Level destination address bits receive information and if B is inactive the processors at the destination specified by the Level destination address bits check the level specific tag bits to determine if the information is to be received at that processor.

7. The apparatus according to claim 3 wherein the tagged instructions to the Level 3 interface are in a bit-serial format including a broadcast bit, Level 3 destination address bits, stage identification tag bits, an error handling bit or bits, an instruction identifier bit set to an active state to indicate an instruction is being sent, a node command field specifying the instruction, and an error handling bit or bits.

8. The apparatus according to claim 3 wherein the tagged data to the Level 4 processors are in a bit-serial format including a broadcast bit, Level 4 destination address bits, NEP number tag bits, an error handing bit or bits, an instruction identifier bit set to an inactive state to indicate data is being sent, a group bit, a Conditional Execution Bit (CEB), a data field, and an error handling bit or bits.

9. The apparatus according to claim 1 wherein the Level 3 programmable function and connection processor interface between the NIP and the N NEPs comprises multiple Programmable Communicating Alu Trees (PCATs) wherein each PCAT communicates to, and provides programmable functions on data received from, a group of NEPs, and PCAT internal nodes includes a programmable ALU and a node bypass path which, under a NIP generated mode control mechanism, together allow a programmed function execution of data output from Level 4 NEPs, in a function execution mode, and the transfer of instructions or data to the PCAT nodes and the NEPs in a communications mode.

10. The apparatus according to claim 9 further comprising means for performing a tag matching operation to determine whether to receive and process the instructions or data received at the PCAT node or to transmit the instructions or data to a next PCAT node.

11. The apparatus according to claim 1 wherein the Level 3 PCAT programmable function and connection processor interface between the NIP and the N NEPs is comprised of an instruction set architecture responding to ARITHMETIC and LOGICAL instructions, and wherein within a stage of a Programmable Communicating Alu Tree nodes execute a function in a constant amount of time and in synchronism.

12. The apparatus according to claim 1 wherein each of the N Level 4 NEPs have a SCAT interface to N Level 6 SYPs.

13. The apparatus according to claim 1 wherein each of the N level 4 NEPs comprises an interface to an external memory for reading external input values and teacher values, and reading and writing neuron values.

14. A computer apparatus having a hierarchical architecture for emulating neural networks, the apparatus comprising:
a level 1 processor including a host processor,
a level 2 processor including a neuron instruction processor;
N level 4 processors including neuron execution processors, where N represents the number of physical neurons and is an integer greater than zero;
a level 3 processor interface between the level 2 and level 4 processors;
$N^2$ level 6 processors including synapse processors; and
N level 5 processors including synapse communicating adder trees for providing an interface between the level 4 and level 6 processors.

15. The apparatus according to claim 14, further comprising an N neuron structure partitioned into groups of synapse processing units, each synapse processing unit including means for receiving and storing instructions and data, means for executing instructions, means for group instruction execution, means for communicating to communicating adder trees, and means for interfacing with external storage to communicate weights and neuron output values.

16. The apparatus according to claim 15, wherein the N neuron structure further includes:
neuron activation units;
means for interconnecting the groups of synapse processing units into an N neuron structure for supporting an emulation of V neurons, where V represents the number of virtual neurons and is an integer greater than N;
means for communicating instructions, data, and neuron activation unit outputs back to the synapse processing units through the communicating adder trees.

17. The apparatus according to claim 14, further comprising means for parallel and synchronized execution of a fixed function operation upon level 6 processor data by the N level 5 processors.

18. The apparatus according to claim 14, further comprising means for a user interface with the level 1 processor for providing neural network specifications, and a compiler for producing assembler code from a user input for interfacing with the level 2 processor.

19. The apparatus according to claim 14, wherein the level 2 processor further includes a microcoded controller for issuing tagged instructions and data to the level 4 processors, the tagged instructions and data including data for identifying the level 4 processor to receive the instructions and data, and for identifying if the instructions and data will be resent by the level 4 processor to a selected level 6 processor.

20. The apparatus according to claim 19, wherein the level 2 processor further includes means for coordinating disk access and the level 1 processor's access to storage used by the level 2, level 4, and level 6 processors.

21. The apparatus according to claim 14, wherein the level 3 processor interface comprises orthogonal programmable communicating ALU trees including means for providing programmable functions on data received from a group of level 4 processors, execution means for executing the functions on the received level 4 processor data, communication means for transfer of instructions or data to the level 4 processors, and a level 2 processor control means for activating the execution means or the communication means.

22. The apparatus according to claim 14, wherein the level 3 processor interface comprises a folded array of programmable communicating ALU trees for complete connectivity among the communicating ALU trees' output points via the level 4 processors.

23. The apparatus according to claim 14, wherein the level 3 processor interface comprises programmable communicating ALU trees including means for deciding whether or not a programmed node function is to be executed at a programmable communicating ALU tree's leaf node.

24. The apparatus according to claim 14, wherein the level 5 processors further provide complete connectivity among the level 4 processors.

25. The apparatus according to claim 14, wherein the level 4 processors interface with external memory for reading and writing data such as input values, neuron output values, and programmable values in a trace array.

26. The apparatus according to claim 25, wherein the level 4 processors interface with external memory via a direct addressing mode using an immediate data field of an instruction as an external memory address, an internal addressing mode using an internal counter and level 4 processor instructions, or a register offset mode using a level 4 processor register and an instruction's immediate data field as an offset addressing means.

27. The apparatus according to claim 14, wherein the level 4 processors further include means for receiving all level 4 and level 6 destined instructions and data issued by the level 2 processor.

28. The apparatus according to claim 27, wherein a decoded level 6 instruction or data is forwarded to the level 6 processors through the level 5 processors, and wherein a new level 4 or level 6 instruction is not executed pending a completion response received by the level 4 processors sent via the level 5 processors.

29. The apparatus according to claim 14, wherein each of the level 4 processors comprise a neuron execution instruction set, including means for selecting any required registers, memory, data, or bits as source operands, for providing results to at least one destination, and for setting any operation completion flags.

30. The apparatus according to claim 14, wherein the level 2 processors include means for specifying a number of times a level 4 processor executes an instruction or group of instructions upon successively received operands.

31. The apparatus according to claim 14, further comprising level 4 processor means for indicating to one of the level 2 processors a successful, unsuccessful, or erroneous operation.

32. A computer system apparatus having a multi-level processing structure for emulating neural networks, the multi-level structure comprising:
a plurality of processing levels, a first one of the processing levels including at least one host processor, a second one of the processing levels including at least one neuron instruction processor, a third one of the processing levels including at least one neuron execution processor, a forth one of the processing levels including at least two synapse processors, and each of the plurality of levels including means for executing instructions;
means for communicating instructions and data between adjacent processing levels including:
means for said at least one neuron instruction processor to interface with said at least one neuron execution processor; and
interface means between said at least one neuron execution processor and said at least two synapse processors including a synapse communicating adder tree.

* * * * *